US012386502B2

(12) United States Patent
Ko

(10) Patent No.: US 12,386,502 B2
(45) Date of Patent: Aug. 12, 2025

(54) APPLICATION MANAGEMENT APPARATUS AND CONTROLLING METHOD THEREFOR

(71) Applicant: LG ELECTRONICS INC., Seoul (KR)

(72) Inventor: Kye Yeon Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

(21) Appl. No.: 18/043,761

(22) PCT Filed: Sep. 4, 2020

(86) PCT No.: PCT/KR2020/011946
§ 371 (c)(1),
(2) Date: Mar. 2, 2023

(87) PCT Pub. No.: WO2022/050455
PCT Pub. Date: Mar. 10, 2022

(65) Prior Publication Data
US 2023/0259273 A1 Aug. 17, 2023

(51) Int. Cl.
*G06F 3/04886* (2022.01)
*G06F 3/04817* (2022.01)
*G06F 3/0486* (2013.01)

(52) U.S. Cl.
CPC ...... *G06F 3/04886* (2013.01); *G06F 3/04817* (2013.01); *G06F 3/0486* (2013.01)

(58) Field of Classification Search
CPC .................................................. G06F 3/04886
See application file for complete search history.

(56) References Cited

U.S. PATENT DOCUMENTS

| 8,082,003 B2 | 12/2011 | Jee |
| 2012/0071211 A1* | 3/2012 | Yokota ..................... H04B 1/38 |
| 2012/0225693 A1* | 9/2012 | Sirpal et al. ............. G06T 3/60 |

(Continued)

FOREIGN PATENT DOCUMENTS

| KR | 10-2014-0146992 | 12/2014 |
| KR | 10-1546774 | 8/2015 |

(Continued)

OTHER PUBLICATIONS

PCT International Application No. PCT/KR2020/011946, International Search Report dated Jun. 1, 2021, 4 page.

(Continued)

*Primary Examiner* — James J Debrow
(74) *Attorney, Agent, or Firm* — LEE, HONG, DEGERMAN, KANG & WAIMEY

(57) ABSTRACT

A mobile terminal includes a display positioned at a first side of the mobile terminal and at a second side facing the first side. A controller is configured to identify a first application set related to a first area of the first side of the display, identify a second application set related to a second area of the display, and cause the display to display, based on at least a portion of the second area being positioned at the second side and in response to an input related to the first area, information associated with at least one application selected based on setting information for an application included in the first application set and the second application set, in at least a portion of the first area.

15 Claims, 23 Drawing Sheets

(56) References Cited

U.S. PATENT DOCUMENTS

| | | | |
|---|---|---|---|
| 2018/0018753 A1* | 1/2018 | McLaughlin | ............ G06T 3/40 |
| 2020/0175945 A1 | 6/2020 | Chen et al. | |
| 2022/0179455 A1* | 6/2022 | Zhu et al. | ............ G06F 1/1641 |

FOREIGN PATENT DOCUMENTS

| | | |
|---|---|---|
| KR | 10-2016-0051986 | 5/2016 |
| KR | 10-2017-0116883 | 10/2017 |
| KR | 10-2018-0129432 | 12/2018 |

OTHER PUBLICATIONS

Korean Intellectual Property Office Application No. 10-2023-7000082, Notice of Allowance dated Mar. 26, 2025, 5 pages.

* cited by examiner (a)

(b)

(a)

(b)

(a)

(b)

2201  2202

APPLICATION MANAGEMENT APPARATUS AND CONTROLLING METHOD THEREFOR

CROSS-REFERENCE TO RELATED APPLICATION(S)

This application is the National Stage filing under 35 U.S.C. 371 of International Application No. PCT/KR2020/011946, filed on Sep. 4, 2020, the contents of which are hereby incorporated by reference herein in its entirety.

TECHNICAL FIELD

This disclosure relates to a device for managing an application and a control method thereof. One particular implementation relates to a mobile terminal for managing an application and displaying information associated with the application in response to a change in a size of a display positioned at a first side among the first side and a second side of a device and a control method thereof.

BACKGROUND ART

Advances in network technologies and expansions of infrastructures have enabled a mobile terminal to perform diversified and professional tasks. In this regard, there has been an increasing desire for a mobile terminal with a display that displays content on a large screen.

However, a display providing a large screen may increase in size in proportion to a screen size. Thus, it is necessary to consider a portability along with a size of the display in terms of a mobile terminal of which the portability is emphasized, such as a smartphone.

For this, there can be considered a method to change a size of a display as necessary by applying a foldable or rollable display having a sufficient elasticity to the mobile terminal. For example, a portion of a display may be rolled up to a rear side of a mobile terminal and rolled out or moved as necessary such that a portion of the display positioned at a front side of the mobile terminal increases in size.

For example, a size of a display positioned at a front side of the mobile terminal may increase from a first size to a second size. In this case, in response to the display positioned at the front side increasing in size, the user may use a larger area of the display.

However, in this case, the application may be managed in consideration of the change in display. For example, when the content of the application is displayed while the display is extended, displaying of the content may be suspended due to a change in a layout of an area representing the content in response to the display being retracted. Thus, a method to manage the application more efficiently based on the change in the layout of the area is required.

DISCLOSURE OF INVENTION

Technical Goals

An aspect provides a mobile terminal for efficiently managing an application in consideration of a change in a size of a display positioned at a first side of the mobile terminal and a control method of the mobile terminal.

Technical goals of the present disclosure are not limited as mentioned above and, although not mentioned, may include goals that can be clearly understood by those skilled in the art to which the present disclosure pertains, from the following description.

Technical solutions

According to an aspect, there is provided a mobile terminal including a display positioned at a first side of the mobile terminal and a second side facing the first side and a controller, wherein the controller is configured to identify a first application set related to a first area positioned to the first side of the display and a second application set related to a second area and display, when at least a portion of the second area is positioned to the second side, in response to an input related to the first area, information associated with at least one application selected based on setting information on applications included in the first application set and the second application set in at least a portion of the first area.

According to another aspect, there is also provided a method of controlling a mobile terminal including a display positioned at a first side of the mobile terminal and a second side facing the first side, the method including identifying a first application set related to a first area positioned to the first side of the display and a second application set related to a second area and displaying, when at least a portion of the second area is positioned to the second side, in response to an input related to the first area, information associated with at least one application selected based on setting information on applications included in the first application set and the second application set in at least a portion of the first area.

Effects

According to example embodiments, it is possible to provide a mobile terminal for efficiently managing an application in consideration of a change in a size of the display positioned at the first side of the mobile terminal and a control method of the mobile terminal.

For example, the mobile terminal and the control method of the mobile terminal may select at least one application based on setting information on an application related to a first area positioned to the first side of the mobile terminal, so that information associated with the selected application is displayed in the first area of the first side of the mobile terminal in response to at least a portion of the first area being positioned to a second side of the mobile terminal. In this case, the selected application may be executed and at least one of the remaining applications may be terminated, which may improve efficiencies in a battery and a memory of the mobile terminal.

Effects are not limited to the aforementioned effects, and other effects not mentioned will be clearly understood by those skilled in the art from the description of the claims.

BEST MODE FOR CARRYING OUT THE INVENTION

Figure 1:
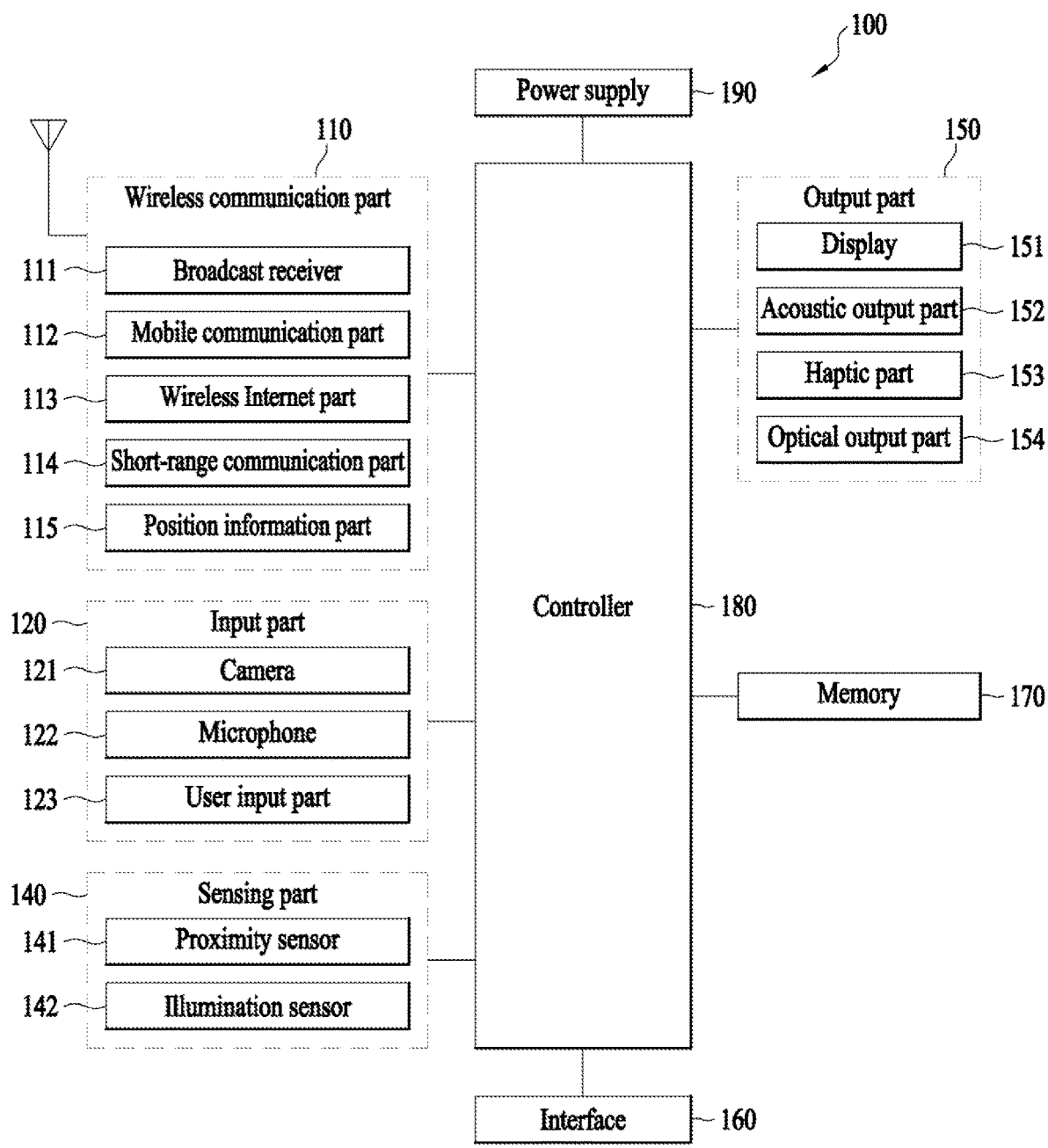
FIG. 1 is a block diagram illustrating a mobile terminal.

Hereinafter, example embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known arts will be omitted when it is deemed that such description will cause ambiguous interpretation of the present disclosure. In addition, the accompanying drawings are only for easy understanding of the embodiments disclosed in the present specification, and the technical ideas disclosed in the present specification are not limited by the accompanying drawings. Also, it should be understood to cover all modifications, equivalents, and alternatives falling within the spirit and scope of the present specification.

Although terms such as "first" and "second" may be used herein to describe various elements, these elements are not to be limited by these terms. Rather, these terms are only used to distinguish one element from another element.

When an element is described as being "connected to" or "coupled to" another element, it may be directly "connected to" or "coupled to" the other element or there may be other elements intervening therebetween. In contrast, when an element is described as being "directly connected" or "directly coupled to" another element, there can be no other elements intervening therebetween.

The singular forms are intended to include the plural forms as well, unless the context clearly indicates otherwise.

In the present specification, it will be further understood that the terms "comprises" or "includes", when used herein, specify the presence of stated features, integers, steps, operations, elements, components, or combinations thereof, but do not preclude the presence or addition of one or more other features, integers, steps, operations, elements, components, or combinations thereof.

FIG. 1 is a block diagram illustrating a mobile terminal (or electronic device) 100 related to an example embodiment of the present disclosure.

The mobile terminal 100 may include a wireless communication part 110, an input part 120, a sensing part 140, an output part 150, an interface 160, a memory 170, a controller (or processor) 180, and a power supply 190. The components illustrated in FIG. 1 are not essential to implementing the electronic apparatus, so the mobile terminal 100 described herein may have more or fewer components than those listed above.

Specifically, the wireless communication part 110 may include at least one module that enables wireless communication to be performed between the mobile terminal 100 and a wireless communication system, between the mobile terminal 100 and another mobile terminal 100, or between the mobile terminal 100 and an external server. The wireless communication part 110 may include one or more modules that connect the mobile terminal 100 to one or more networks.

The wireless communication part 110 may include at least one of a broadcast receiver 111, a mobile communication part 112, a wireless Internet part 113, a short-range communication part 114, and a position information part 115.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may also function as the user input part 123 that provides an input interface between the mobile terminal 100 and a user and simultaneously, provide an output interface between the mobile terminal 100 and the user.

The interface 160 may function as a passage to various types of external devices connected to the mobile terminal 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the mobile terminal 100 may perform an appropriate control associated with the connected external device.

The memory 170 may store data supporting various functions of the mobile terminal 100. The memory 170 may store application programs (or applications) run in the mobile terminal 100, data for operation of the mobile terminal 100, and instructions. At least a portion of the application programs may be downloaded from an external server through wireless communication. Also, at least a portion of the application programs may exist in the mobile terminal 100 for a basic function (for example, call forwarding and outgoing function and message receiving and outgoing function) of the mobile terminal 100 from the time of manufacture. The application program may be stored in the memory 170, installed in the mobile terminal 100, and run by the controller 180 to perform an operation (or function) of the mobile terminal.

The controller 180 generally controls an overall operation of the mobile terminal 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the mobile terminal 100.

The power supply 190 may supply power to each component included in the mobile terminal 100 by receiving external or internal power under a control of the controller 180. The power supply 190 may include a battery such as a built-in battery or a removable battery.

At least a portion of the aforementioned components may operate in cooperation with each other to implement an operation, a control, or a control method of the mobile terminal 100 according to various embodiments as described below. Also, the operation, control, or control method of the mobile terminal 100 may be implemented on the mobile terminal 100 through an execution of at least one application program stored in the memory 170.

Figure 2:
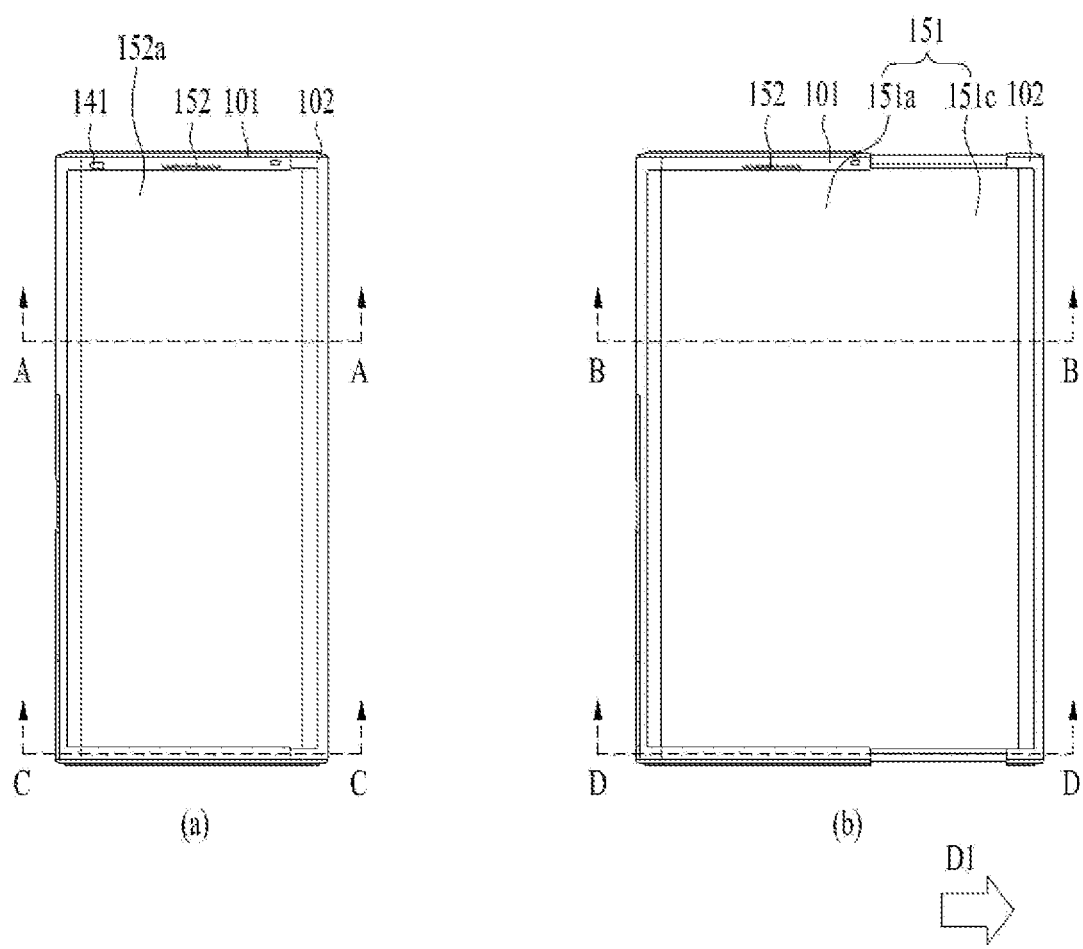
FIG. 2 illustrates front views of a mobile terminal in a first state and a second state according to an example embodiment.
Figure 3:
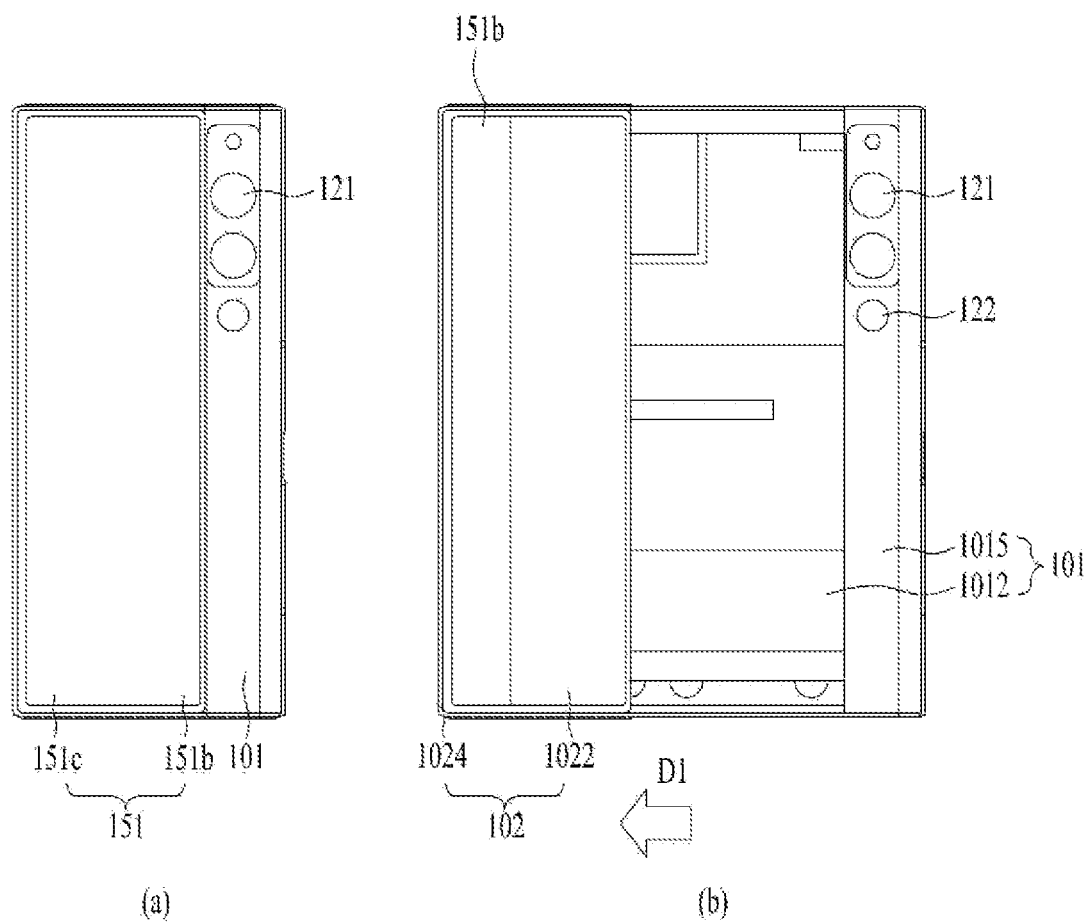
FIG. 3 illustrates rear views of a mobile terminal in a first state and a second state according to an example embodiment.

FIG. 2 illustrates front views of a mobile terminal in a first state and a second state, and FIG. 3 illustrates rear views of the mobile terminal in the first state and the second state. (a) of FIG. 2 and (a) of FIG. 3 illustrate the first state in which the mobile terminal is retracted. (b) of FIG. 2 and (b) of FIG. 3 illustrate the second state in which the mobile terminal is extended.

As illustrated, the mobile terminal 100 in the first state is retracted and has a smaller size when compared to the mobile terminal 100 in the second state. Also, in the first state, a display part or display 151 located at a front side of the mobile terminal 100 may be reduced in size when compared to the second state. The mobile terminal 100 may be extended in a first direction D1 in the first state to enter the second state. In the second state, as shown in (b) of FIG. 2, the size of the mobile terminal 100 and the size of the display 151 located at the front side may increase when compared to the first state. Also, in the second state, the size of the display 151 located at a rear side may be reduced as shown in (b) of FIG. 3. In other words, a portion of display 151 located at the rear side of the mobile terminal 100 in the first state may move to the front side of the mobile terminal 100 in the second state.

In the following description, a direction in which the mobile terminal 100 and the display 151 thereof are extended or enlarged may be referred to as the first direction D1. In addition, a direction in which the mobile terminal 100 and the display 151 thereof are contracted, retracted, or reduced in the second state to enter the first state may be referred to as a second direction D2. Also, a direction vertical to the first direction D1 and the second direction D2 may be referred to as a third direction. The following description may be based on a case in which the first direction and the second direction are horizontal directions and the third direction is a vertical direction. In some cases, based on a placement of the mobile terminal 100, the first direction D1 and the second direction D2 may be vertical directions and the third direction may be a horizontal direction.

The display 151 may use the flexible display 151 to be bent so that a position of the display 151 is changeable. The flexible display 151 may be maintained in a flat state like a typical flat panel display and include a display (e.g., electronic paper) to be curved, bent, folded, twisted, or rolled like a paper. Also, the flexible display 151 may include a lightweight and durable display fabricated on a thin and flexible substrate. The flexible display 151 may be bendable in a predetermined direction like a paper and disposed such that a curvature is changed in the first direction.

The electronic paper may be a display technology based on characteristics of a general ink, and different from the typical flat panel display in using reflected light. The electronic paper may use a twist ball or electrophoresis using a capsule to change information.

In a state in which the flexible display 151 is not deformed (for example, a state having an infinite curvature radius, hereinafter, referred to as a default state), a display area of the flexible display 151 may be a plane. In the default state, when the flexible display 151 is deformed by an external force (for example, a state having a limited curvature radius, hereinafter, a deformed state), the display area may be a curved plane. As illustrated, information displayed in the deformed state may be visual information displayed on the curved plane. The visual information may be implemented by individually controlling light emission of sub-pixels arranged in a matrix form. The sub-pixel may be a minimum unit for implementing one color. When the external force is applied to the flexible display 151, the flexible display 151 may be changed from a flat state, which is the default state, to a curved state.

The flexible display 151 may implement a flexible touch screen in combination with a touch sensor. In response to a touch being input to the flexible touch screen, the controller 180 of FIG. 1 may perform a control corresponding to the touch input. The flexible touch screen may be configured to sense a touch input even in the deformed state as well as the default state.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The mobile terminal 100 may include a deformation detection part that detects a deformation of the flexible display 151. The deformation detection part may be included in the sensing part 140 of FIG. 1.

The deformation detection part may be provided in the flexible display 151 or a case (a first frame 101 and a second frame 102 described below) to sense information related to the deformation of the flexible display 151. The information related to the deformation may include, for example, a direction in which the flexible display is deformed, a degree of deformation, a deformed position, a deformation time, and an acceleration at which the deformed flexible display 151 is restored. In addition, the information related to the deformation may be various information to be detected in response to the flexible display 151 being bent.

Also, based on the information related to the deformation of the flexible display 151 detected by the deformation detection part, the controller 180 may change information displayed on the flexible display 151 or generate a control signal for controlling functions of the mobile terminal 100.

The deformation of the flexible display 151 may vary based on positions of the first frame 101 and the second frame 102. As illustrated in FIG. 2, since a bent position of the flexible display 151 is determined based on the positions of the first frame 101 and the second frame 102, a front-side exposed area and a bending-deformed position of the flexible display 151 may be calculated based on the positions of the first frame 101 and the second frame 102 instead of the deformation detection part of the flexible display 151.

A state change (to the first state or the second state) of the flexible display 151, for example, a size change of the display 151 occurring at the front side or the rear side of the mobile terminal 100 in response to a size change of the mobile terminal 100 may be manually performed by force applied by a user but not be limited to such a manual manner. For example, when the mobile terminal 100 or the flexible display 151 is in the first state, the mobile terminal 100 or the flexible display 151 may be changed to enter the second state by a command of the user or an application irrespective of the external force applied from the user. To automatically deform the flexible display 151 without applying the external force, the mobile terminal 100 may include a driving part 200 described below.

The flexible display 151 may be rolled and bent at 180° with covering a first-direction side portion of the mobile terminal 100. Based on the side portion of the mobile terminal 100, a portion of the flexible display 151 may be located at the front side of the mobile terminal 100 and another portion of the flexible display 151 may be located at the rear side of the mobile terminal 100. For ease of description, the flexible display 151 located at the front side may be referred to as a front-side portion and the flexible display 151 located at the rear side may be referred to as a rear-side portion. The mobile terminal may extend in the first direction or retract in the second direction opposite to the first direction as illustrated in FIG. 2. In this case, an area of the flexible display 151 located at the front side may be changed. In other words, sizes of the front-side portion and the rear-side portion may be changed based on a state change of the mobile terminal.

A portion of the flexible display 151 located at the front side of the mobile terminal 100 may be unmovably fixed to a front side of the first frame 101 while another portion located at the rear side of the mobile terminal 100 is movably provided at the rear side.

The flexible display 151 may be rolled or released at a first-direction side portion of the mobile terminal 100. In this case, a portion located at the rear side of the mobile terminal 100 may be moved to adjust a size of an area of the flexible display 151 located at the front side of the mobile terminal 100. Since the area of the flexible display 151 is set and the flexible display 151 is configured as one continuous body, an area of the rear-side portion may be reduced when an area of the front-side portion is increased. The display 151 may be rolled in the second frame 102 that is movable relative to the first frame 101, for example, on a first-direction side portion of the second frame 102. Also, in order to adjust the area of the display 151 at the front side of the mobile terminal 100, the display 151 may be inserted or pushed into the second frame 102 or withdrawn or pulled out from the second frame 102 while being rolled up at the second frame 102 based on a moving direction of the second frame 102. Such operation will be further described below along with other related components of the mobile terminal 100.

In general, an antenna may be provided in a case or a housing of the mobile terminal 100. However, due to the flexible display 151 that covers the mobile terminal 100 from the front surface to a rear surface thereof, a part for mounting the antenna in the case or housing may be restricted. For this reason, the antenna may be embodied on the flexible display 151. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance. Also, the AOD may transmit or receive a signal directly to or from the display 151. Thus, the AOD may be used in the mobile terminal 100 in which the display 151 is located at both sides as described in the present disclosure.

Figure 4:
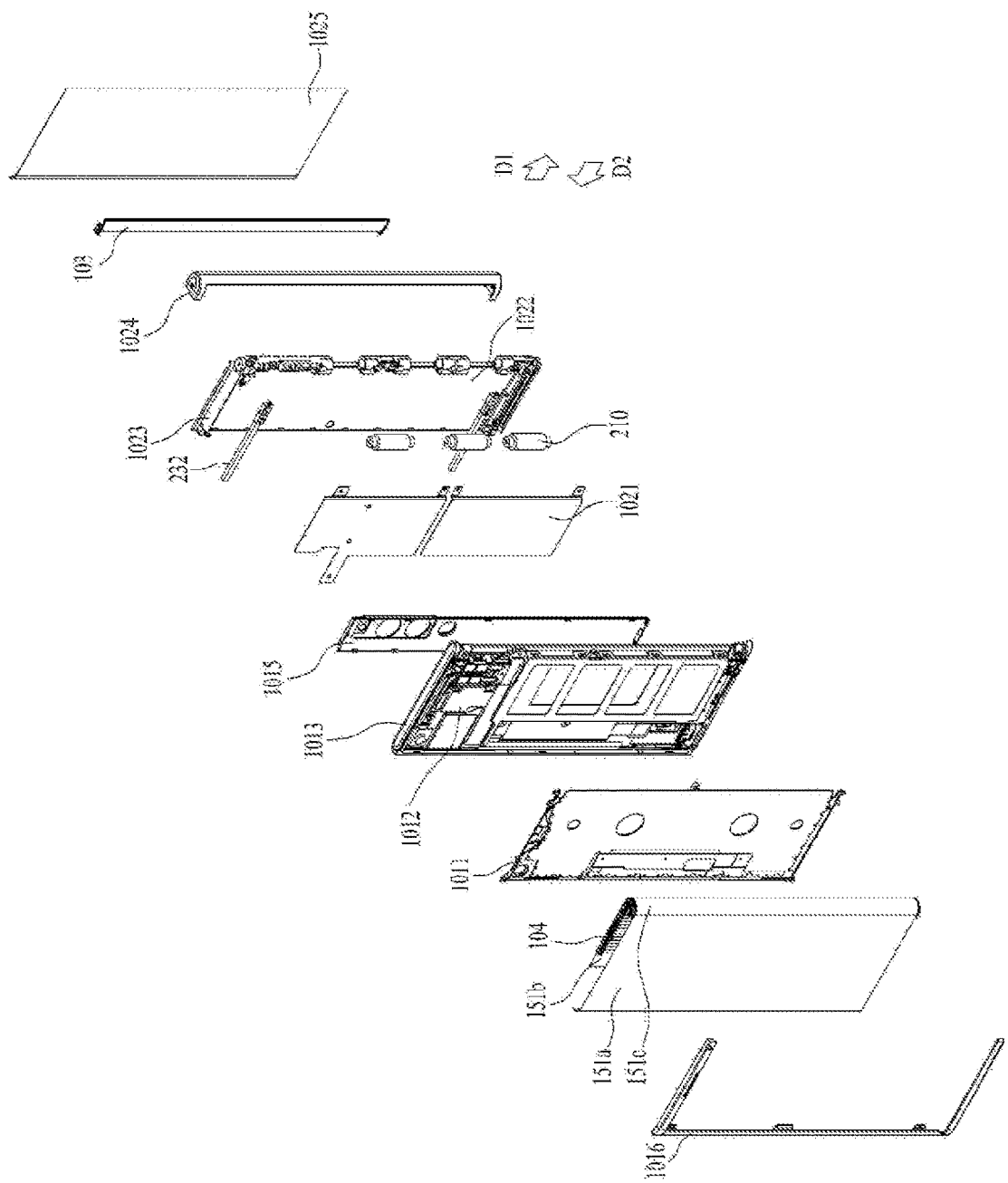
FIGS. 4 and 5 are exploded perspective views illustrating a mobile terminal according to an example embodiment.
Figure 5:
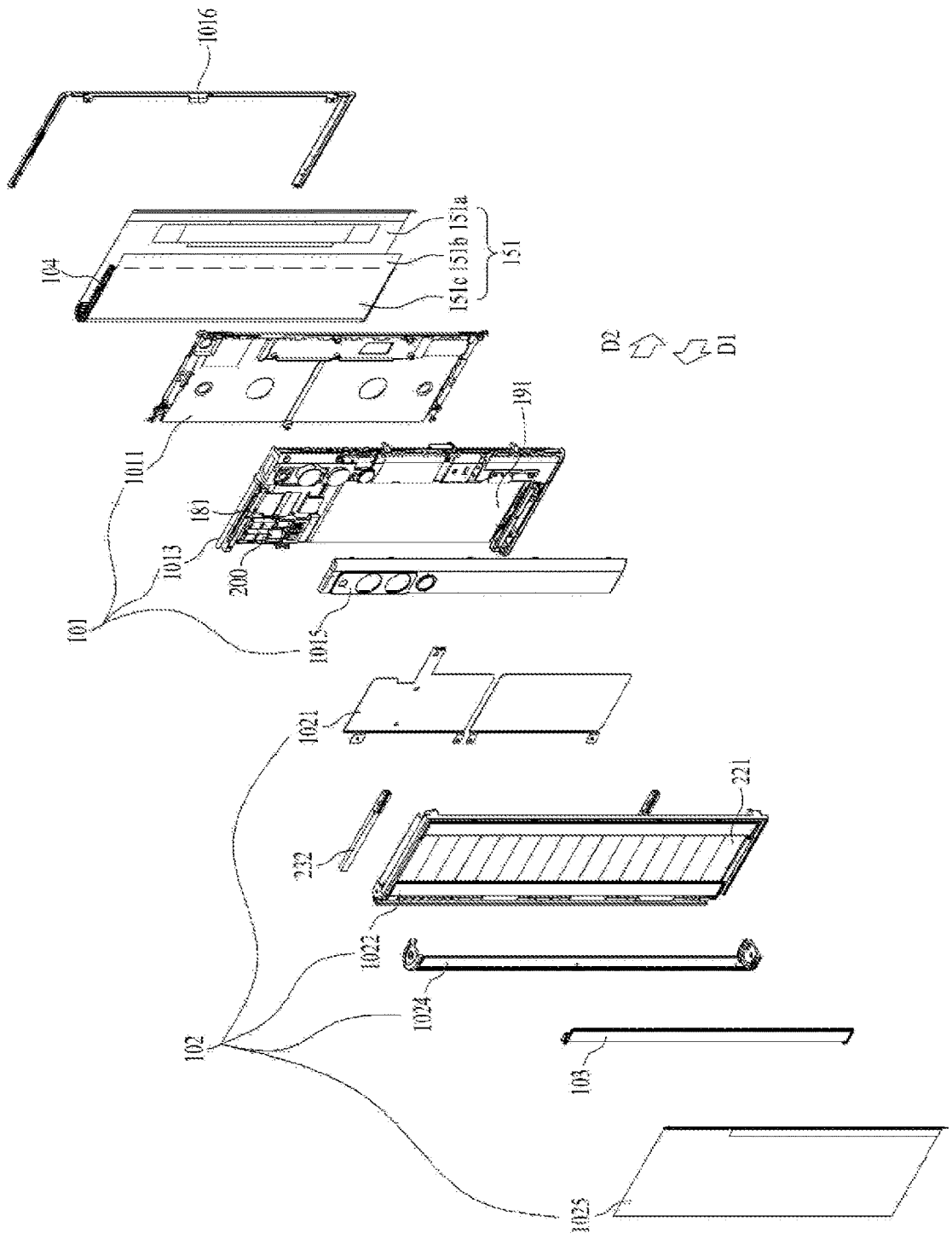

FIGS. 4 and 5 are exploded perspective views illustrating a mobile terminal according to an example embodiment. Specifically, FIG. 4 is an exploded perspective view illustrating a mobile terminal from a front-side direction and FIG. 5 is an exploded perspective view illustrating the mobile terminal from a rear-side direction.

The mobile terminal 100 of the present disclosure may include a frame, for example, the first frame 101 and the second frame 102 to mount components therein. As illustrated in FIG. 2, the frame may be changed in size in the first direction. At least one frame may relatively move so as to be changed in size in the first direction. The frame may include an electronic component mounted therein. Also, the flexible display 151 may be located external to the frame.

Since the mobile terminal 100 of the present disclosure includes the flexible display 151, the flexible display 151 may be coupled in a form of covering a front side and a rear side of the frame. The frame may include the first frame 101 and the second frame 102 that moves relative to the first frame 101 in the first direction. The first frame 101 and the second frame 102 may each include a front portion, a rear portion, and a side portion and may be coupled to each other.

The first frame 101 may correspond to a main body of the mobile terminal 100 and have a space for accommodating components between a first front portion 1011 and a first rear portion 1012. Also, the first frame 101 may accommodate, in the space, the second frame 102 that is movably coupled to the first frame 101. Specifically, as illustrated in FIGS. 2 and 5, the first frame 101 may include the first front portion 1011 that is disposed in the front of the mobile terminal 100 to support the front-side portion of the display 151 and the first rear portion 1012 that is disposed in the rear of the mobile terminal 100 so that various components are mounted therein.

The first front portion 1011 and the first rear portion 1012 may be separated in a predetermined distance such that a predetermined space is formed therebetween. Also, the first front portion 1011 and the first rear portion 1012 may be connected by a first side portion 1013. The first side portion 1013 may be integrally formed with the first rear portion 1012 or the first front portion 1011. The camera 121, the acoustic output part 152, an input and output terminal, the controller 180, and the power supply 190 may be accommodated in the space of the first frame 101 as components of the mobile terminal 100. For example, the controller 180 may be a circuit board 181 including an electric circuit and a processor provided to control an operation of the mobile terminal 100. In addition, the power supply 190 may be a battery 191 and related components. Also, the below-described driving part 200 that controls a slide movement of the second frame 102 may be accommodated in the first frame 101.

As described above, the display 151 may have a continuous body and rolled in the mobile terminal 100 to be located both front side and rear side of the mobile terminal 100. The display 151 may include a front-side portion located at the front side of the mobile terminal 100, a rear-side portion located at the rear side of the mobile terminal 100, and a side portion located between the front-side portion and the rear-side portion to cover a side surface of the mobile terminal 100. The front-side portion and the rear-side portion of the display 151 may be flat and the side portion of the display 151 may be curved. When the side portion is bent to form an angle, the flexible display 151 may be damaged. Thus, the side portion may be provided to be bent with a predetermined curvature.

The display 151 may include a fixed portion and a variable portion. The fixed portion may be a portion fixed to a frame. Since the fixed portion is fixed at the frame, a bending degree of the fixed portion may not be changed so that the fixed portion is maintained in a predetermined shape. The variable portion may be a portion in which an angle or position of a bent portion is changeable. The variable portion may require a structure for supporting a rear surface of the variable portion in in accordance with a change in angle or position of the bent portion.

The fixed portion may be coupled to the first frame 101 of the display 151 and located at the front side so as to be a part of the front-side portion. The variable portion may include a side portion located in a direction to a side surface of the mobile terminal. In this case, a position of the side portion may be changed based on a position of the second frame 102. An area located at the front side and an area located at the rear side may be changed in size based on the side portion. For example, based on whether being in the first state or the second state, a portion of the variable portion may be the front-side portion and another portion may be the rear-side portion. The variable portion may be located in the first direction with respect to the fixed portion (e.g., a first area 151*a* and a second area 151*b*) based on the mobile terminal 100. An end portion of the variable portion may be bent in a direction to the rear side of the mobile terminal 100 and slidably move on the rear side of the second frame 102.

The end portion of the variable portion of the display 151 may be coupled to a sliding frame 103 that guides the end portion to slide on the rear side of the second frame. The sliding frame 103 may move on the second frame 102 in the first direction simultaneously when the second frame 102 moves in the first direction. As a result, the sliding frame 103 may move relative to the first frame 101 by a distance twice that of the second frame 102. Referring to FIG. 3, the first rear portion 1012 of the mobile terminal 100 may include an exposed rear portion 1015 that is not covered by the display 151 and is exposed outside even in the first state. In the exposed rear portion 1015, various buttons for manipulating the mobile terminal 100, switches, the camera 121, the physical input part 120 such as a flash, and the sensing part 140 such as the proximity sensor 141 and a fingerprint sensor may be arranged. The first rear portion 1012 except the exposed rear portion 1015 may be covered by display 151 in the first state as shown in (a) of FIG. 3 and exposed in the rear-side direction in the second state as shown in (b) of FIG. 3.

A typical bar-type terminal may provide a display on only a front side of the terminal. In such terminal, a main camera may be mounted on a rear side of the terminal to allow a user to capture an object facing a side opposite to the display while the user is viewing the object through the display. To allow the user to capture himself or herself while viewing through the display, another camera may be additionally required on a front side of the terminal.

In the present disclosure, the display 151 may be located at both front side and rear side of the mobile terminal 100. When the user captures himself or herself, the display 151 on the same side as the camera 121, that is, the rear-side portion of the display 151 may be used. When the user captures an object facing the side opposite to the user, the front-side portion of the display 151 located on the side opposite to the camera 121 may be used. Through this, the mobile terminal 100 may capture the user and the object facing the side opposite to the user using the single camera 121. The camera 121 may include a plurality of cameras having different angles of view such as a wide angle, an ultra-wide angle, a telephoto, and the like. In addition to the camera 121, a proximity sensor, an acoustic output part, and the like may be located on the exposed rear portion 1015. Also, the antenna 116 may be installed thereto. In view of exterior design, an exposure decoration may be attached to protect the camera and sensor of the exposed rear portion 1015. In the exposure decoration, a portion corresponding to the camera 121 or the sensing part 140 may be configured to be transparent and another portion may have a predetermined pattern or color in consideration of design so internal components are not be exposed.

The first side portion 1013 may extend along edges of the first front portion 1011 and the first rear portion 1012 to cover a perimeter of the first frame 101 and form an appearance of the mobile terminal 100. As described above, since the second frame 102 is accommodated in the first frame 101 and movably coupled thereto, a portion of the first frame 101 may be open to allow a relative movement of the second frame 102 with respect to the first frame 101.

Referring to FIG. 2, because the second frame 102 is movably coupled to the first frame 101 in the first direction, the first side portion 1013 may not be formed on the first-direction side surface and thus, may be open. Since the first side portion 1013 is exposed external to the mobile terminal 100, the interface 160 for connecting a power port or an ear jack, or the user input part 120 such as a volume button may be disposed therein. When including a metal material, the first side portion 1013 may serve as an antenna.

The second frame 102 may include a second front portion 1021 located in the front of the mobile terminal 100 and a second rear portion 1022 located in the rear of the mobile terminal 100. Like the first front portion 1011 and the first rear portion 1012 of the first frame 101, the second front portion 1021 and the second rear portion 1022 may be formed as substantially flat panel members. The second frame 102 may accommodate various components and may not interfere with the components accommodated in the first frame 101 during the movement. The second front portion 1021 and the second rear portion 1022 may be coupled to each other so that a predetermined space is formed therebetween. Also, the second front portion 1021 and the second rear portion 1022 may be shaped not to interfere with the components included in the first frame 101.

Figure 6:
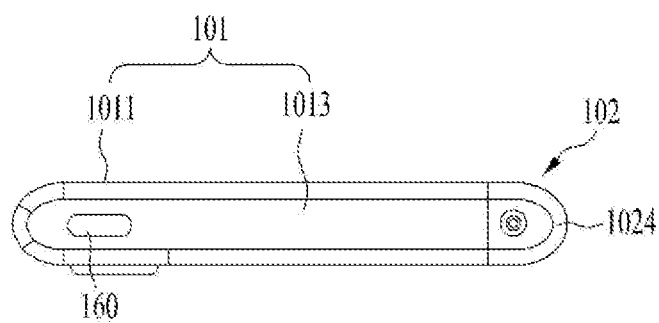
FIG. 6 illustrates side views of a mobile terminal from a third direction according to an example embodiment.
Figure 6:
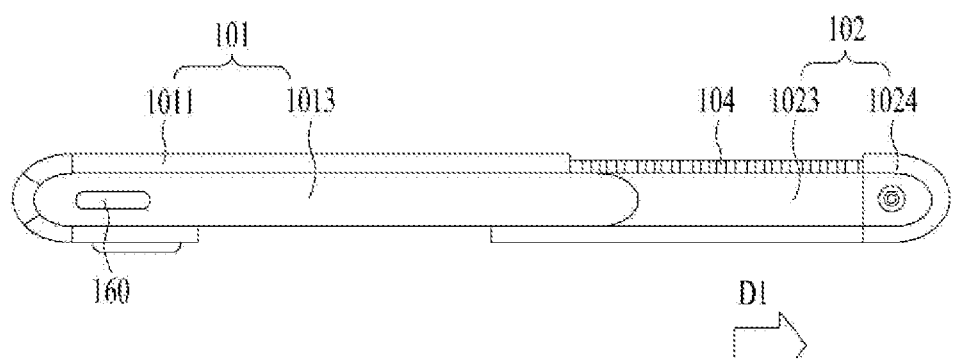

FIG. 6 illustrates side views of the mobile terminal 100 from the third direction. FIG. 6 illustrates the first side portion 1013 of the first frame 101 and a second side portion 1023 of the second frame 102. A first-direction end portion of the second frame 102 may not be exposed outside since the flexible display 151 is located. Also, a second-direction end portion of the second frame 102 may be open to prevent interference with the first frame 101. The second side portion 1023 of the second frame 102 located in the third direction (in the drawings, an upper or lower direction or including both upper and lower directions) may overlap the first side portion 1013 of the first frame 101 not to be exposed outside in the first state. In the second state, however, the second side portion 1023 may be exposed outside because the second frame 102 is pulled out.

The display 151 may be rolled in the second frame 102 and bent at 180° so as to be located at both front and rear sides of the mobile terminal 100. For such arrangement of the display 151, the second frame 102 may include a roller 210 rotatably disposed therein. The roller 210 may be disposed at a predetermined position in the second frame 102. To provide a high-quality display to a user, the display 151 may be flatly spread on the front side and the rear side of the mobile terminal 100. For this, a sufficient tensile force may be provided to the display 151. To provide the sufficient tensile force, the roller 210 may be disposed at the first-direction end portion of the second frame 102. The roller 210 may be extended in the second direction and rotatably coupled to the second frame 102.

The display 151 may be gently bent with a predetermined curvature to be rolled on the roller 210. The flexible display 151 may include a first surface exposed outside to display an image and an inner surface facing a frame on the other side. The roller 210 may be installed in the second frame 102 to be freely rotatable while contacting the inner surface of the display 151. Practically, the roller 210 may move the display 151 in a lateral direction, that is, a direction vertical to a longitudinal direction of the mobile terminal 100. As described below, when the second frame 102 slides, the display 151 having a direction (e.g., the first direction D1 or the second direction D2) different from and relative to the second frame 102 may be moved to the front side or the rear side of the mobile terminal 100 by the tensile force applied from the second frame 102. In this instance, the roller 210 may guide the movement of the display 151 while rotating.

The roller 210 may be disposed adjacent to the first-direction end portion of the second frame 102 and include a side frame 1024 disposed at the first-direction end portion of the second frame 102 to prevent damage to the display 151 rolled on the roller 210.

The side frame 1024 may extend in the longitudinal direction of the second frame 102 (e.g., the third direction) to cover the first-direction side portion, so as to protect the roller 210 and the display 151 rolled thereon. Also, the side frame 1024 may be relocated based on a state of the mobile terminal 100. The side portion may have a predetermined curvature and be rolled by the roller 210. An inner surface of the side frame 1024 may include a curved surface corresponding to the curvature of the side portion.

The side frame 1024 may substantially form an appearance of the mobile terminal 100 along with the first side portion 1013 of the first frame 101. Also, to minimize interference with the components of the first frame 101 during the movement, a second-direction side portion of the second frame 102 may be omitted.

During expansion and retraction in the first direction D1 and the second direction D2, the second frame 102 may overlap the first frame 101, for example, the first front portion 1011 and the first rear portion 1012 of the first frame 101 to prevent the interference with the first frame 101. Specifically, as described above, the display 151 may be coupled to the first front portion 1011 of the first frame 101 and supported by the first front portion 1011. Thus, the display 151 may not be additionally supported by the second front portion 1021 of the second frame 102.

When the second front portion 1021 is located between the first front portion 1011 and the display 151, the display 151 may be deformed or damaged due to a friction with the second front portion 1021 moving repetitively. To prevent this, the second front portion 1021 may be disposed below the first front portion 1011 or inserted between the first front portion 1011 provided as two pieces. The second rear portion 1022 of the second frame 102 may be disposed in a rear-side direction of the first rear portion 1012 of the first frame 101. For example, a front side of the second rear portion 1022 may face a rear side of the first rear portion 1012. Also, to stably support a motion of the second frame 102, the rear side of the first rear portion 1012 may contact the front side of the second rear portion 1022. In such arrangement, the second rear portion 1022 may be exposed external to the first frame 101, for example, external to the first rear portion 1012 and coupled to the display 151.

The second frame 102 may extend and retract in the first and second directions D1 and D2 such that a size of the mobile terminal 100, for example, a size of the front side of the mobile terminal 100 is increased or reduced. In this instance, to obtain the intended first and second states, the display 151 may be moved based on the increased or reduced portion of the front side. When the display 151 is fixed to the second frame 102, the display 151 may not be moved in response to the front side of the mobile terminal 100 being extended or retracted. For this reason, the display 151 may be movably coupled to the second frame 102.

Specifically, the display 151 may include the first area 151a located at the front side of the mobile terminal 100 and the second area 151b coupled to the sliding frame 103 located at the rear side of the mobile terminal 100. The display 151 may also include a third area 151c located between the first area 151a and the second area 151b. The third area 151c may be bent to cover the roller 210 and may move to the front side or the rear side based on a state change of the mobile terminal 100. The sliding frame 103 may be provided as a panel-type member that extends in the longitudinal direction of the mobile terminal 100 (e.g., the third direction), and coupled to the second rear portion 1022 to be movable in the first direction D1 and the second direction D2.

The first area 151a, the second area 151b, and the third area 151c may be connected to one another and form a continuous body of the display 151. Also, as described above, to allow the third area 151c to move to the front side or the rear side of the mobile terminal 100 based on a moving direction of the second frame 102, the first area 151a may be unmovably fixed to the front side of the mobile terminal 100 and the second area 151b may be movably provided on the rear side of the mobile terminal 100. Such configuration of the display 151 will be described in detail below.

The first area 151a may be located at the front side of the mobile terminal 100, for example, the front side of the first front portion 1011 of the first frame 101. The first area 151a may be fixed to the front side of the first frame 101, for example, the front side of the first front portion 1011 so as not to move even when the second frame 102 moves. Through this, the first area 151a may always be exposed at the front side of the mobile terminal 100.

The third area 151c may be adjacent to the first area 151a. The third area 151c may extend into the second frame 102 to be rolled on the roller 210. Continually, the third area 151c may extend out of the second frame 102 and partially cover the second frame 102, for example, the rear side of the second rear portion 1022. Meanwhile, since the second frame 102, that is, the second rear portion 1022 is adjacent to the first frame 101, for example, the first rear portion 1012 and forms a rear case of the mobile terminal 100 together, it can be understood that the third area 151c is also arranged at the rear side of the first frame 101.

The second area 151b may be adjacent to the third area 151c and located at the rear side of the mobile terminal 100, for example, the rear side of the second rear portion 1022 of the second frame 102. The second area 151b may be coupled to the sliding frame 103 instead of being coupled directly to the second frame 102.

As a result, the first area 151a may be located at the front side of the mobile terminal 100 to be always exposed at the front side irrespective of the movement of the second frame 102. Also, the second area 151b may be located at the rear side of the mobile terminal 100 to be always exposed at the rear side irrespective of the movement of the second frame 102. The third area 151c may be between the first and second areas 151a and 151b and selectively arranged at the front side or the rear side of the mobile terminal 100 based on the moving direction (e.g., D1, D2) of the second frame 102.

In such a selective arrangement of the third area 151c, since the third area 151c moves to the front side of the mobile terminal 100 and the second rear portion 1022 moves in the first direction D1 in the second state, a first rear portion 1012's portion which is covered by the second area 151b and the third area 151c of the display 151 and the second rear portion 1022 in the first state may be exposed external to the mobile terminal 100. Also, in the first state, the second front portion 1021 of the second frame 102 may be disposed hidden by the first front portion 1011 of the first frame 101. In the second state, however, the second front portion 1021 may be moved out of the first frame 101 to support the third area 151c of the display 151 located at the front side of the mobile terminal 100.

A separating plate may be further provided to prevent the second front portion 1021 from affecting inside components during the sliding movement. The separating plate may be located in a rear-side direction of the second front portion 1021 and coupled to the first front portion 1011. The second front portion 1021 may move between the first front portion 1011 and the separating plate in response to the slide movement of the second frame 102.

The third area 151c may be rolled on the roller 210 in the second frame 102 to be curved. When the first state is changed to the second state, the third area 151c may extend from the second frame 102 to the front side of the mobile terminal 100 while being rolled on the roller 210 in one direction. When the second state is changed to the first state, the third area 151c may be rolled on the roller 210 in a reverse direction to retract from the front side of the mobile terminal 100 to the second frame 102. Simultaneously, the third area 151c may return from the second frame 102 to the rear side of the mobile terminal 100.

An opening-book-type foldable mobile terminal may be repetitively folded at a predetermined position and thus, easily damaged at the position. In contrast, a deformed portion of the flexible display 151, that is, a portion to be rolled on the roller 210 may vary based on the first and second state of the mobile terminal 100, that is, the movement of the second frame 102. As such, the mobile terminal 100 of the present disclosure may significantly reduce deformation and fatigue repetitively applied to a predetermined portion of the display 151 so that the damage to the display 151 is prevented.

Based on the above-described configuration, an overall operation of the mobile terminal 100 will be described as follows. In one example, a state transition may be performed manually by a user, and an operation of the mobile terminal 100 performed during such a manual state transition will be described. However, the below-described operations of the first to third frames 101 to 103 and the display 151 may be equally performed even when a power source other than user's power is used, for example, the driving part 200 is applied as described later.

A rear cover 1025 may be further provided on the rear side of the second rear portion 1022 to prevent an external exposure of the rear-side portion of the display 151 located at the rear side of the mobile terminal 100. When the rear cover 1025 includes a transparent material, the rear-side portion may also be used even in the first state. When an opaque material is used for the rear cover 1025, the rear cover 1025 may cover the sliding frame 103 such that the moving of the sliding frame 103 is not exposed outside. The sliding frame 103 and the second and third areas of the display 151 may move in the first direction and the second direction in a space between the second rear portion 1022 and the rear cover 1025.

Figure 7:
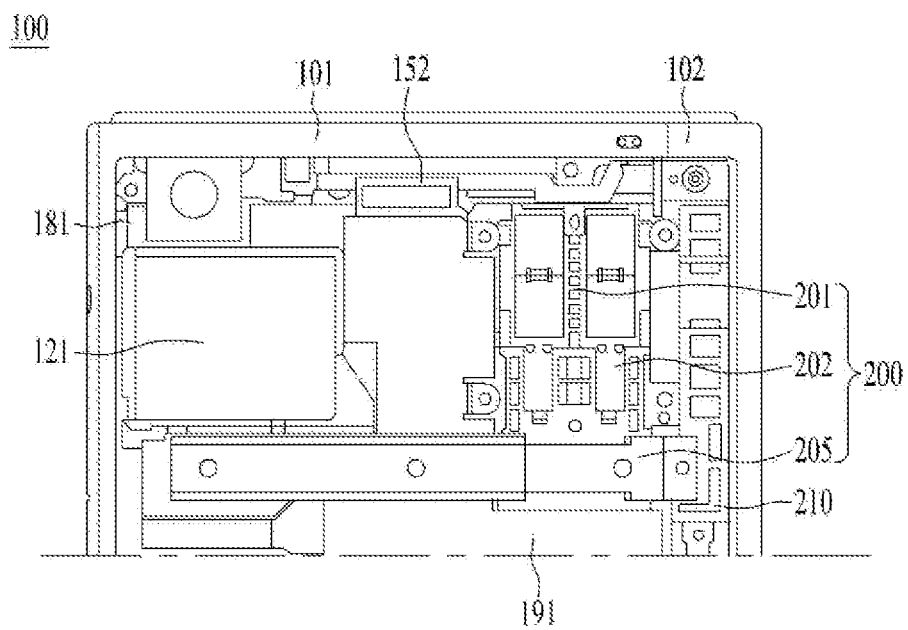
FIG. 7 illustrates a driving part of a mobile terminal according to an example embodiment.
Figure 7:
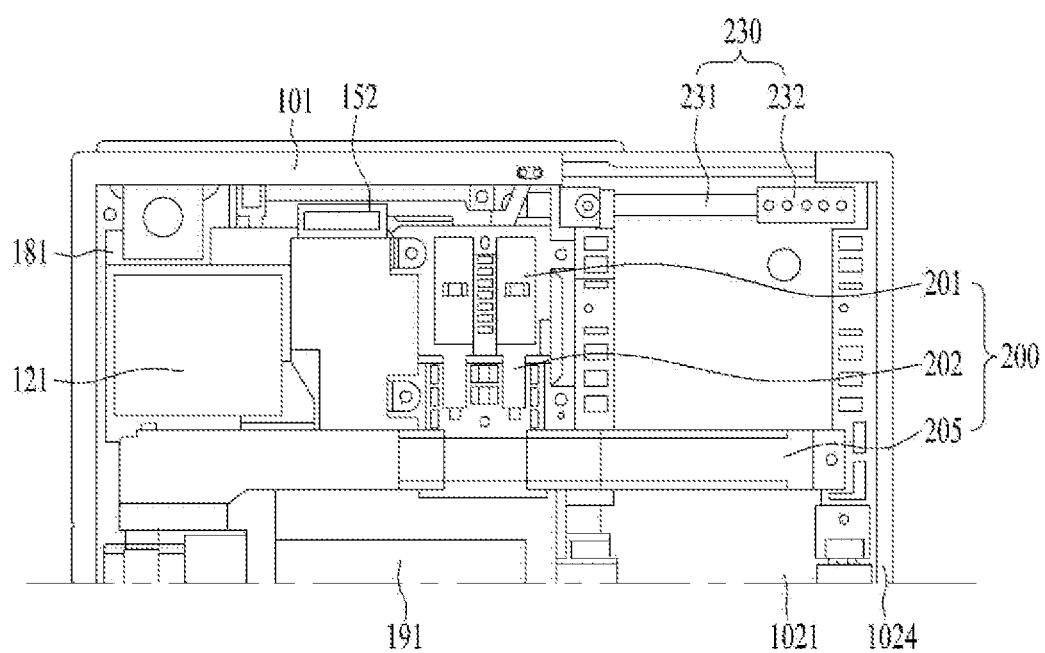

FIG. 7 illustrates the driving part 200 of the mobile terminal 100 according to an example embodiment. The mobile terminal 100 of the present disclosure may change a state of the mobile terminal 100 using a method in which a user manually pulls the second frame 102 out of the first frame 101 in the first direction or pushes the second frame 102 into the first frame 101 in the second direction. However, the manual method may cause damage when an excessive force is applied to a main body of the mobile terminal 100. Thus, the mobile terminal 100 may further include the driving part 200 using a motor 201 to stably move the second frame 102 without twisting.

The motor 201 may use the motor 201 that provides a rotating force as illustrated in FIG. 7 and may also use a linear motor that performs a rectilinear motion. To increase the rotating force provided by the motor 201, a diameter of the motor 201 may also be increased. Referring to FIG. 7, two motors 201 may be used to provide a predetermined intensity of driving force or more while preventing an increase in thickness in a restricted space of the mobile terminal 100. The second frame 102 moving too fast may lead to damage or false operation. Thus, a planetary gear may be further provided to reduce the speed of the motor 201 so the motor 201 moves at a stable speed. A planetary gear 202 may serve to amplify or attenuate a number of revolutions of the motor 201 using a plurality of disc gears with different numbers of teeth.

The motor 201 may be fixed to the first frame 101 as shown in (a) of FIG. 7. Also, as shown in (b) of FIG. 7, a position of the motor 201 may be fixed even when the mobile terminal 100 enters the second state in response to the second frame 102 moving in the first direction.

Since the second frame 102 linearly moves in the first direction or the second direction with respect to the first frame 101, a rack and pinion that converts a rotating force of the motor 201 into the linear motion may be used. A pinion gear receiving the rotating force of the motor 201 may be arranged to engage with a rack gear 205 having teeth consecutively arranged in the first direction. The pinion gear may be fixed to the first frame 101 along with the motor 201, and the rack gear 205 may be located at the second frame 102. Conversely, the first frame 101 may also be located at the rack gear 205, and the pinion gear may also be located at the second frame 102 along with the motor 201. Since the pinion gear is caught by the motor 201 so as not to rotate, the second frame 102 may be maintained in the first state and the second state. However, when a large external force is applied, the pinion gear may rotate, which may lead to a displacement of the second frame 102.

Although not shown, a stopper may be further provided to fix a position between the first frame 101 and the rack gear 205 or the second frame 102 so the mobile terminal 100 is fixedly in the first state or the second state. When the motor 201 is driven in response to current being applied, the stopper may be released to allow movement of the second frame 102. When current is not applied so the motor 201 does not rotate, the stopper may be engaged to fix the second frame 102 and a position of the second frame 102.

When the driving part 200 is provided as a pair of driving parts symmetrically disposed in a vertical direction (e.g., the third direction) the driving part 200 may stably move. However, to arrange a battery and the like in consideration of a limited mounting space of the mobile terminal 100, the driving part 200 may be disposed biasedly on one side as shown in (a) of FIG. 7. In some cases, due to such an asymmetric position of the driving part 200, an upper portion and a lower portion of the second frame 102 may move at different speeds so the second frame 102 is twisted. To prevent this, a linear guide 230 may be further provided in the mobile terminal 100.

The linear guides 230 may be provided in both third-direction ends, for example, an upper side and a lower side of the mobile terminal 100 to complement a function of the driving part 200 disposed biasedly on the one side. The linear guide 230 may include a guide rail 231 extended in the first direction and a guide block 232 moving along the guide rail 231. The guide rail 231 may be disposed on the first frame 101 and the guide block 232 may be disposed on the second frame 102, and vice versa. In the present embodiment, the guide rail 231 may be disposed on the second frame 102 to cover upper and lower side surfaces of an extended portion of the second frame 102 in the second state.

The guide block 232 may be coupled to the first frame 101, the guide rail 231 may be coupled to the second frame 102, and then the guide block 232 and the guide rail 231 may be slidably coupled. For the convenience of installation, in a state of the guide block 232 and the guide rail 231 are coupled, the guide block 232 may be fixed to the first frame 101, and then the second frame 102 may be coupled to the guide rail 231.

The guide block 232 may include a guide groove into which the guide rail 231 is inserted. The guide rail 231 may include a rail groove into which a portion of the guide block 232 is inserted. Projections may be formed on a fastening portion of the guide block 232 and the guide rail 231 so the guide rail 231 and the guide block 232 move in the first direction or the second direction without deviating in a thickness direction of the mobile terminal 100. To reduce a friction between the guide block 232 and the guide rail 231, a member formed of a material having a high wear resistance, a low friction resistance, and a self-lubricating property such as polyoxymethylene (POM) or a bearing may be added inside the guide groove.

Figure 8:
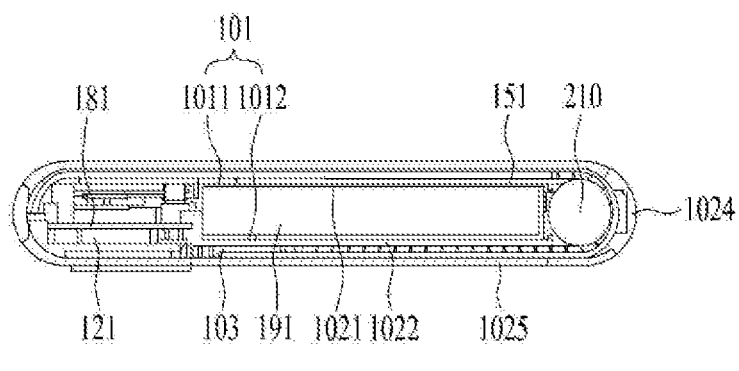
FIG. 8 illustrates cross-sectional views taken along lines A-A and B-B of FIG. 2.
Figure 8:
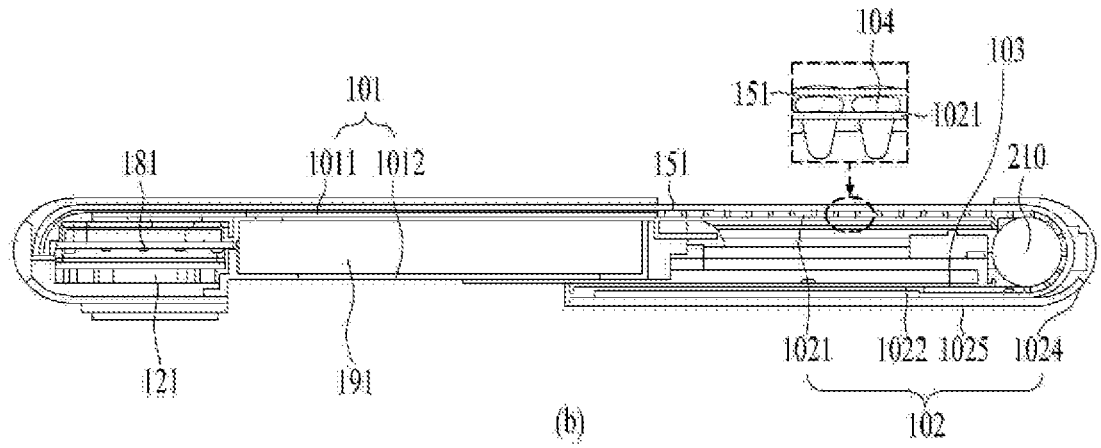

FIG. 8 illustrates cross-sectional views taken along lines A-A and B-B of FIG. 2. Specifically, (a) of FIG. 8 is a cross-sectional view taken along the line A-A of FIG. 2 and (b) of FIG. 8 is a cross-sectional view taken along the line of FIG. 2. As illustrated in FIG. 2, when the second frame 102 moves in the first direction and enters the second state, the third area 151c located in the rear-side direction may move in the front-side direction. In this case, a structure for supporting the rear side of the third area 151c moved to the front side may be required. The second front portion 1021 located at the front side of the second frame 102 may be located at the rear side of the third area 151c in the second state. However, because the second front portion 1021 may overlap the first front portion 1011 of the first frame 101 in the first state, the first front portion 1011 and the second front portion 1021 may have a level difference therebetween. The level difference between the first front portion 1011 and the second front portion 1021 may create a boundary between the first area 151a and the third area 151c of the flexible display 151. A rolling plate 104 may be used as a support structure for filling a space between the second front portion 1021 and the third area 151c of the flexible display 151.

The rolling plate 104 may be located at the rear side of the flexible display 151 and may have a thickness corresponding to a space between the second front portion 1021 and the flexible display 151 in the second state. As shown in (a) of FIG. 8, in the first state, the rolling plate 104 may be rolled on the roller 210 and located in a direction to the side surface and the rear side of the mobile terminal 100. Also, the flexible display 151 and the rolling plate 104 may be located between the rear cover 1025 covering the rear-side portion of the display 151 and the second rear portion of the second frame 102. As shown in (b) of FIG. 8, when switching to the second state, the rolling plate 104 may move to the front side and thus, located in a front portion of the second frame 102.

The third area 151c in which the rolling plate 104 is located may be a portion in which bending deformation occurs when the first state is changed to the second state. Thus, the rolling plate 104 may be deformed based on the deformation of the third area 151c. Simultaneously, the rolling plate 104 may have a predetermined stiffness such that the flexible display 151 is maintained as being flat when the flexible display 151 is located at the front side or the rear side. As such, the rolling plate 104 may require a structure to be maintained as being flat in the third direction and to be bending-deformable in the first direction.

Figure 9:
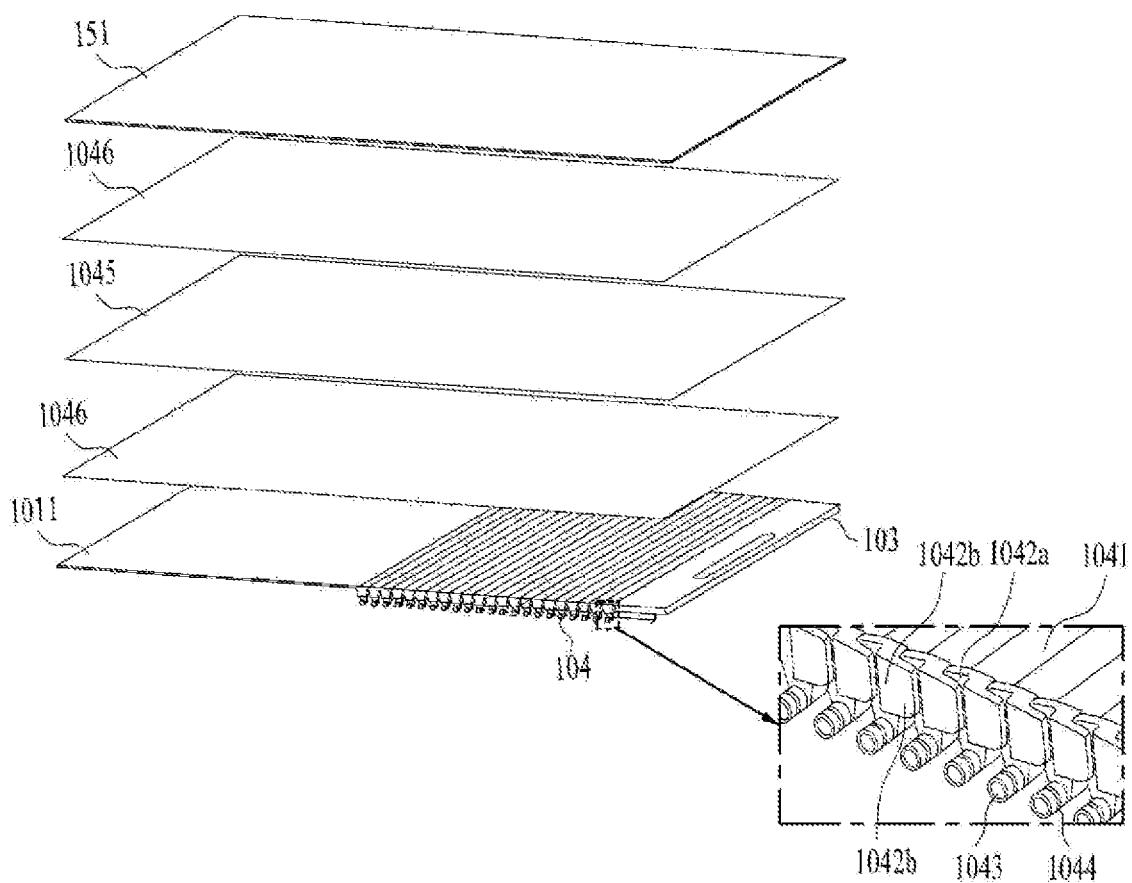
FIG. 9 illustrates a display part and a rolling plate of a mobile terminal according to an example embodiment.

FIG. 9 illustrates the rolling plate 104 and the display 151 of the mobile terminal 100 according to an example embodiment. The rolling plate 104 may include a plurality of support bars 1041 extended in the third direction. The plurality of support bars 1041 may be arranged in parallel in the first direction at preset intervals. Through such arrangement, even when the flexible display 151 is rolled on the roller 210 to be bent, the plurality of support bars 1041 may be prevented from interfering with each other. The support bar 1041 may be implemented as an injection-molded object having a predetermined thickness to achieve the stiffness and may include a metal material such as stainless steel (SUS), for example.

The plurality of support bars 1041 may be directly attached to the rear side of the display 151. In this case, however, it may take a long time and a lot of defects, which may decrease productivity. Also, in a case of directly processing the display 151, the display 151 may be easily damaged. To prevent this, the mobile terminal 100 may further include a rolling sheet 1045 to fix the plurality of support bars 1041. The rolling sheet 1045 may include a metal material, and may use a material having ultra-elasticity to be bending-deformed and maintained as being flat after the bending deformation.

For example, an ultra-elastic metal sheet such as a thin STS sheet having a thickness of 0.05 millimeters (mm) or less may be used. To attach the support bar 1041 to the rolling sheet 1045 and attach the rolling sheet 1045 to the rear side of the display 151, an adhesive tape may be applied to both sides of the rolling sheet 1045. The adhesive tape may correspond to, for example, a first sheet 1046. However, it is merely an example, and the first sheet 1046 may be replaced with another element.

The rolling sheet 1045 may have a kerf pattern in which a groove extending in the third direction is provided in plural in the first direction. The grooves of the kerf pattern may be formed between the plurality of support bars 1041. Also, desirably, the grooves may be formed in a side on which the support bars 1041 are attached to the rolling sheet 1045. The kerf pattern may be formed in a wedge shape such that a size is large in a surface part of the rolling sheet 1045 and narrowed gradually.

Instead of using the rolling sheet 1045, a material having elasticity such as silicon may be disposed between the support bars 1041 to couple the neighboring support bars 1041 so an angle between the support bars 1041 varies. An elastic connecting part may be bent at a position corresponding to the roller 210 and if located at the front side or the rear side, may stretch so that the support bars 1041 are arranged to form a plane.

The support bars 1041 may form a flat plane corresponding to the rear side of the display 151. Also, as shown in (b) of FIG. 8, the support bars 1041 may form a curved plane with a predetermined curvature. The support bars 1041 of the curved plane may be in close contact with a curved surface of the roller 210 when the rolling plate 104 is rolled on the roller 210.

In some cases, the support bars 1041 may form a plane having one flat surface in contact with the display 151 and the other surface curved with a curvature corresponding to the curvature of the roller 210. In such cases, the support bars 1041 may have maximal thicknesses at a first-directional end and a second-directional end and have a minimum thickness at a center.

The rolling plate 104 may be located at a position corresponding to the third area 151c, and rolled and bent over the roller 210 to span the front side and the rear side. The rolling plate 104 may be connected to the first front portion 1011 of the first frame 101 in the front-side direction and connected to the sliding frame 103 in the rear-side direction. In order for the flexible display 151 to form a continuous surface without a level difference, the first front portion 1011 of the first frame 101 located at the rear side of the first area 151a, the sliding frame 103 located at the rear side of the second area 151b, and the rolling plate 104 located at the rear side of the third area 151c may contact the display 151 at the same height. For example, since the sliding frame 103 moves on the rear side of the mobile terminal 100 and moves in the same space as the rolling plate 104, the rolling plate 104 may have a thickness corresponding to that of the sliding frame 103.

Figure 10:
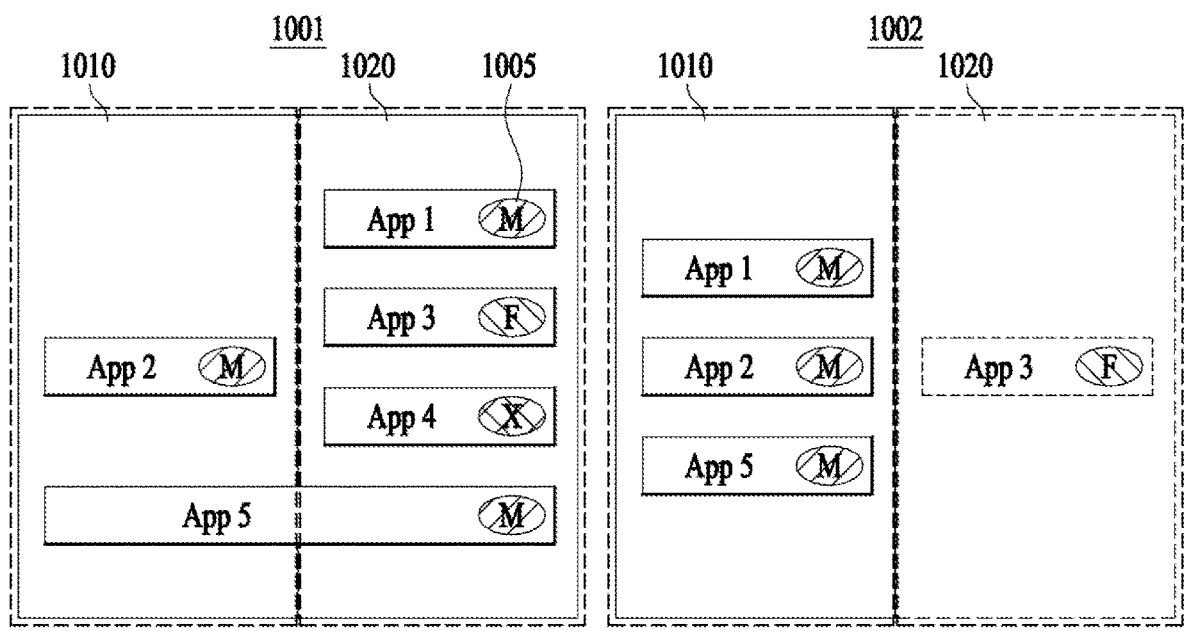
FIG. 10 is a diagram illustrating a mobile terminal according to an example embodiment of the present disclosure.

FIG. 10 is a diagram illustrating a mobile terminal according to an example embodiment of the present disclosure. Specifically, FIG. 10 illustrates an example of changing an area related to each application based on setting information for each application when a size of a display positioned at a first side of a mobile terminal is changed.

Referring to FIG. 10, reference numeral 1001 indicates a case in which a first area 1010 and a second area 1020 of a display are positioned to a first side of the mobile terminal, and reference numeral 1002 indicates a case in which the first area 1010 is positioned to a first side of the mobile terminal and the second area 1020 is positioned to a second side facing the first side of the display.

In the example embodiment, the first area 1010 of the mobile terminal may include an area fixedly positioned to the first side, and the second area 1020 may include an area to be positioned to the first side or the second side of the mobile terminal in accordance with a control of the mobile terminal. For example, when the display positioned to the first side of the mobile terminal is reduced in size, at least a portion of the second area 1020 may be positioned to the second side of the mobile terminal in accordance with the control of the mobile terminal.

As indicated by the reference numeral 1001, applications related to the first area 1010 and the second area 1020 of the mobile terminal may be present. Specifically, in a state in which the first area 1010 and the second area 1020 are positioned to the first side of the mobile terminal, the first area 1010 may be related to a second application (e.g., App 2 of FIG. 10) and a fifth application (e.g., App 5 of FIG. 10), and the second area 1020 may be related to a first application the first application (App 1 of FIG. 10), a third application (App 3 of FIG. 10), a fourth application (App 4 of FIG. 10), and the fifth application (App 5 of FIG. 10). Meanwhile, in the example embodiment, an application related to a predetermined area of the display may include an application displayed in at least a portion of the corresponding area. The application related to the predetermined area may also be related to another area in response to the display being changed in size, and an application may have a set area related to the application based on settings of the application. In addition, the application related to the predetermined area may be included and displayed in an application set list related to the corresponding area.

In example embodiments, applications related to the first area 1010 may be referred to as a first application set and applications related to the second area 1020 may be referred to as a second application set, but it is merely an example.

When the first area 1010 and the second area 1020 of the display are positioned to the first side of the mobile terminal, content of an application related to each area may be displayed in a corresponding area. For example, content of the second application related to the first area 1010 may be displayed in the first area 1010, and content of the first application related to the second area 1020 may be displayed in the second area 1020.

In some cases, when a plurality of applications (e.g., the first application, the third application, the fourth application, and the fifth application) is related to a predetermined area (e.g., the second area 1020), content of an application satisfying a predetermined condition among the plurality of applications may be displayed while displaying of other applications is omitted. For example, the content of the second application may be displayed in the first area 1010 and the content of the first application may be displayed in the second area. In this example, execution of the applications for which displaying of the content is omitted may be maintained. For example, the applications for which displaying of the content is omitted may be in operation in a background. In this case, when a predetermined input is received, content of an application corresponding to the received input may be displayed on the display. For example, when a first input is received, content of the third application may be displayed in the second area 1020 instead of the content of the first application.

In the example embodiment, a screen of FIG. 10 may be displayed in response to a predetermined input being received. For example, in response to an input requesting information on a currently executed application being received, a screen indicated by the reference numeral 1001 may be displayed on the display. For example, in response to a predetermined input being received, the mobile terminal may display information on a related application in each area, that is, each of the first area 1010 and the second area 1020 of the display as indicated by the reference numeral 1001. In this instance, content (e.g., an icon 1005) representing setting information previously designated for each application may be displayed together. In the case indicated by the reference numeral 1002, displaying of a screen corresponding to the second area 1020 may be omitted because the second area 1020 is positioned to the second side, but it is merely an example.

In the example embodiment, setting information may be designated for each application of the mobile terminal in advance. For example, the first application and the fifth application may correspond to first setting information, the third application may correspond to second setting information, and the fourth application may correspond to third setting information. Here, the setting information may include information for setting an area related to an execution of an application or displaying of content of an application in response to a change in size of the display positioned to the first side.

In the example embodiment, when at least a portion of an area related to an application is positioned to the second side of the mobile terminal, the first setting information may include information for allowing content related to the application to be displayed through another area positioned to the first side. As an example, as indicated by the reference numerals 1001 and 1002, when the second area 1020 related to the first application is positioned to the second side, the first application may be changed to be related to the first area 1010. Accordingly, the content of the first application may be displayed through the first area 1010. As another example, when at least a portion of an area related to an application is positioned to the second side of the mobile terminal, the first setting information may include information allowing the application to be executed based on other areas remaining on the first side.

In the example embodiment, when at least a portion of an area related to an application is positioned to the second side, the second setting information may include information allowing content related to the application to be displayed in the area related to the application in response to the area positioned to the second side being positioned to the first side. For example, as indicated by the reference numerals 1001 and 1002, when the second area 1020 related to the third application is positioned to the second side, an area related to the third application may maintain the second area 1020. In this case, although not shown, based on the second area 1020 being positioned to the first side of the display, the content related to the third application may be displayed through the second area 1020. In this instance, until the second area 1020 is positioned back to the first side, the execution of the third application may be maintained while displaying of the content of the third application is suspended. In some cases, at this time, until the second area 1020 is positioned back to the first side, the execution of the third application may not be terminated but suspended.

In the example embodiment, when at least a portion of an area related to an application is positioned to the second side, the third setting information may include information for terminating displaying of content related to the application. In terms of the third setting information, even when the area positioned to the second side is positioned back to the first side, a terminated application may not be executed again. For example, as indicated by the reference numerals 1001 and 1002, in terms of the fourth application, the execution may be terminated in response to the second area 1020 being positioned to the second side.

Meanwhile, as indicated by the reference numeral 1001, setting information on an application related to the first area 1010 fixedly positioned to the first side of the display may be designated as the first setting information, for example, setting information for changing a related area to be the first area 1010 in response to the second area 1020 being positioned to the second side. However, it is merely an example, and setting information on the application related to the first area 1010 may not be designated separately.

In the example embodiment, a predetermined application may be related to the first area 1010 and the second area 1020 in a state in which the first area 1010 and the second area 1020 are positioned to the first side of the display. For example, like the fifth application shown in the drawing, when designated to be the first setting information, the fifth application may be changed to relate to the first area 1010 in response to the second area 1020 being related to the second side. Accordingly, content related to the fifth application may be displayed through the first area 1010.

In the example embodiment, the reference numeral 1002 may indicate a case in which the second area 1020 is positioned to the second side of the mobile terminal while setting information is designated for each application as indicated by the reference numeral 1001. In this case, as indicated by the reference numeral 1002, an application corresponding to the first setting information may be changed to relate to the first area. Accordingly, content of the application corresponding to the first setting information may be displayed through the first area. As indicated by the reference numeral 1002, an execution of an application corresponding to the second setting information, that is, the third application may be maintained in a state being related to the second area 1020. In this case, the third application may be in operation in the background, and content displaying for the third application is suspended. The third application may be displayed through the second area 1020 positioned to the first side in response to at least a portion of the second area 1020 being positioned back to the first side.

In the example embodiment, the above-described applications (e.g., the first application through the fifth application) may include an application installed in the mobile terminal, and may include an application executed for operating the mobile terminal based on a user input or settings of the mobile terminal. However, it is merely an example, and in some cases, the above-described applications may include a recently executed application that has been executed within a predetermined time.

Figure 11:
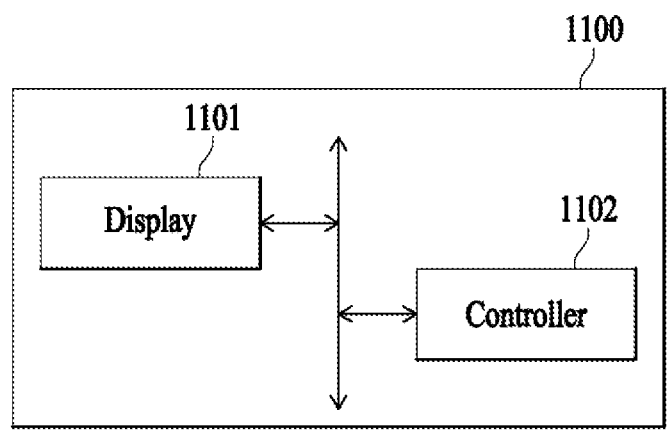
FIG. 11 is a block diagram illustrating a mobile terminal according to an example embodiment of the present disclosure.

FIG. 11 is a block diagram illustrating a mobile terminal according to an example embodiment of the present disclosure. As described below, an element of a mobile terminal 1100 may be a unit that processes at least one function or operation, and may be implemented through hardware, software, or a combination of hardware and software.

Referring to FIG. 11, the mobile terminal 1100 may include a display 1101 and a controller 1102. However, it is merely an example, and other elements may be further included in some example embodiments. In addition, at least one of the display 1101 and the controller 1102 may be implemented as a configuration including a microprocessor.

The display 1101 may display a variety of information associated with an operation of the mobile terminal 1100. For example, the display 1101 may display content of the application provided based on an execution of the application. Here, the content of the application may include various content related to a function of the application provided based on the execution of the application.

The display 1101 may display information on an application executed in the mobile terminal 1101 in response to a predetermined input being received. For example, in response to a first input being received, the display 1101 may display information associated with an application recently executed in the mobile terminal 1101 or information associated with an application being currently executed. The recently executed application may include, for example, an application executed within a first time range from a current point in time. Information associated with an application may include information representing the application and an icon (or content) representing setting information on the application but is not limited thereto.

In addition, in the example embodiment, the display 1101 may include a touchscreen. In this case, a touch input received on the display 1101 may be sensed.

The display 1101 may be disposed such that a size by which the display 1101 is exposed at a first side of the mobile terminal 1100 (e.g., a front side of the mobile terminal 1100) is changeable. The size by which the display 1101 is exposed at the first side may be changed based on a control of the controller 1102 described below.

In the example embodiment, a portion of the display 1101 may be located at the first side of the mobile terminal 1100 and another portion may be located at another side of the mobile terminal 1100 (e.g., a rear side or a side surface of the mobile terminal 1100). As an example, a first area of the display 1101 may be located at the first side of the mobile terminal 1100 and a second area of the display 1101 may be located at the second side facing the first side. As another example, the first area of the display 1101 may be located at the first side of the mobile terminal 1100, and at least a portion of the second area of the display 1101 may be located at a third side. The third side may be located between the first side and the second side and wound on one side of the mobile terminal 1100.

In the example embodiment, a portion of the display 1101 may be located at the first side. In addition, another portion of the display 1101 may be wound on one side of the mobile terminal 1100 and located at the second side of the mobile terminal 1100. Specifically, the display 1101 may be bent at one end contacting the first side, have at least a portion located at the first side, and have at least another portion located at the second side contacting the one end. However, embodiments are not limited thereto. The display 1101 may be divided into a plurality of areas connected using hinges. The display 1101 may be disposed such that one area of the plurality of areas is fixedly located at the first side and another area is located at the first side or the second side based on hinge driving.

The controller 1102 may control the mobile terminal 1100 or an element of the mobile terminal 1100. For example, the controller 1102 may execute application programs or instructions stored in a memory, thereby controlling an operation of the camera 1101 or the display 1101.

The controller 1102 may identify a first application set related to a first area positioned to the first side of the display 1101 and a second application set related to a second area. Here, the first application set may include at least one application of which content is displayed through the first area of the display 1101. The second application set may include at least one application of which content is displayed through the second area of the display 1101.

When at least a portion of the second area is positioned to the second side, in response to an input related to the first area, the controller 1102 may display information associated with at least one application selected based on setting information on an application included in the first application set and the second application set in at least a portion of the first area. The at least one application selected based on the setting information may include an application related to the first area among applications included in the first application set and the second application set.

Here, the input related to the first area (hereinafter, referred to as a "first input") may include an input set to display information associated with an application corresponding to the first area. In response to the first input being received, the controller 1102 may identify at least one application corresponding to the first area among the applications of the first application set and the second application set and display information the identified at least one application in at least a portion of the first area.

The information associated with the at least one application may include information representing each of the at least one application and an icon (or content) representing setting information on each of the at least one application. The information representing each of the at least one application may include, at least one of, for example, exemplary information on at least one content provided through an execution of an application, a name of the application, and an icon representing the application.

In some cases, the first input may include an input requesting information associated with an application set to represent content on the display positioned at the first side, to display on the first side.

In such cases, the controller 1102 may receive the first input in a state in which the first area and the second area are positioned to the first side. Accordingly, information on the first application set and the second application set may be displayed in at least a portion of the first area and the second area.

In the example embodiment, the controller 1102 may identify a third application set related to the first area and the second area. The third application set may include at least one application of which content is to be provided through each of the first area and the second area. That is, at least one application included in the third application set may provide content through the first area and may also provide content through the second area.

In this case, when at least a portion of the second area is positioned to the second side, in response to an input related to the first area, that is, the first input, the controller 1102 may display information related to at least one application selected based on setting information on an application included in the first application set, the second application set, and the third application set in at least a portion of the first area.

In the example embodiment, the setting information may include information for setting a display area related to an execution of an application in response to a placement of an area related to the application being changed. The setting information may be designated for each application included in the first application set and the second application set.

The setting information may correspond to at least one of the first setting information, the second setting information, and the third setting information. Specifically, a type of setting information may be classified as the first setting information, the second setting information, and the third setting information. The first setting information may be information for setting, when at least a portion of an area related to an application is positioned to the second side, information related to the application to be displayed in at least a portion of the area positioned to the first side. The second setting information may be information for setting, when at least a portion of an area related to an application is positioned to the second side, information associated with the application to be displayed in the area related to the application in response to the area positioned to the second side being positioned back to the first side. The third setting information may be information for setting, when at least a portion of an area related to an application is positioned to the second side, displaying of information associated with the application to be terminated.

In some example embodiments, the first setting information may be referred to as a move type because an application-related area may be changed. In addition, the second setting information may be referred to as a fixed type because an application-related area is fixed. Also, the third setting information may be referred to as a finish type because an application-related area may disappear based on a change in size of the display. However, since such terms are merely an example, various terms can be used, and the present embodiments are not limited to those terms.

In the example embodiment, in response to the icon (or content) representing the setting information being displayed, the controller 1102 may receive an input to the icon. The input to the icon may include, for example, a touch input to the icon. When the input to the icon is received, the controller 1102 may change setting information on an application corresponding to the icon. For example, an input to a first icon may be received in a state in which the first icon is displayed in response to the first application corresponding to the first setting information. In this example, the controller 1102 may change the first icon to a second icon corresponding to the second setting information and change setting information on the first application to the second setting information. A related example will be described in detail with reference to FIG. 14.

In the example embodiment, in response to the first input being received in a state in which the first area and the second area are positioned to the first side, the controller 1102 may display information associated with the first application set in the first area and display information associated with the second application set in the second area. The controller 1102 may change setting information on an application corresponding to a second input for at least a portion of the displayed information associated with the first application set and the displayed information associated with the second application set based on the second input.

Here, the second input may include, for example, a drag input for selecting and moving information corresponding to a predetermined application. For example, the second input may include an input for selecting at least one of application-related information displayed and moving the selected information from a currently displayed area to another area. In this case, setting information on the application may be changed based on the input.

For example, the controller 1102 may receive the second input for selecting one of at least one application corresponding to the second application set displayed in the second area and moving the selected application above at least a portion of the first area. In this example, setting information on the application corresponding to the second input may be changed to be the setting information associated with the first area, for example, the first setting information.

In the example embodiment, the controller 1102 may change the setting information on the application based on at least one of a moving direction and an input position of the second input. As an example, when the second input is received, the controller 1102 may identify an area corresponding to the moving direction of the second input. The controller 1102 may change the setting information on the application such that the setting information relates to an area in which an application corresponding to the second input is identified. As another example, the controller 1102 may identify a position at which the second input ends and change the setting information on the application such that an area corresponding to the identified position relates to the application.

Specifically, for example, the controller 1102 may receive the second input for selecting at least a portion of information on the first application displayed in the second area and moving the selected portion to the first area. The controller 1102 may identify a moving direction of the second input, and when the identified moving direction corresponds to a moving direction from the second area to the first area, change the setting information on the first application to be the first setting information that is the setting information associated with the first area. When the setting information on the first application has been already the first setting information, the setting information may remain without changing.

In some example embodiments, the controller 1102 may change the setting information on the application corresponding to the second input based on the second input for content displayed in at least a portion of the first area and the second area. For example, while content of each application, that is, content provided in response to the application being executed is displayed in each of the first area and the second area, the controller 1102 may receive the second input to at least a portion of the content. Here, the second input may receive an input for selecting and moving at least a portion of the content. In this case, the controller 1102 may change setting information on an application corresponding to the content based on the moving direction of the second input or an endpoint of the second input. A related example will be described in detail with reference to FIG. 17.

In the example embodiment, the controller 1102 may receive a drag input (hereinafter, referred to as a "third input") moving at a predetermined position (or in a predetermined area). The controller 1102 may identify a moving distance of the third input, and when the identified moving distance is a first distance, display information associated with an application included in the first application set and information associated with an application included in the second application set in separate areas. For example, the controller 1102 may display the information associated with the application included in the first application set in the first area and display the information associated with the application included in the second application set in the second area. When the identified moving distance is a second distance, the controller 1102 may display the information associated with the application included in the first application set and the information associated with the application included in the second application set in a same area. For example, the controller 1102 may display the information associated with the application included in the first application set and the information associated with the application included in the second application set in at least a portion of the first area and the second area. A related example will be described in detail with reference to FIG. 23.

Figure 12:
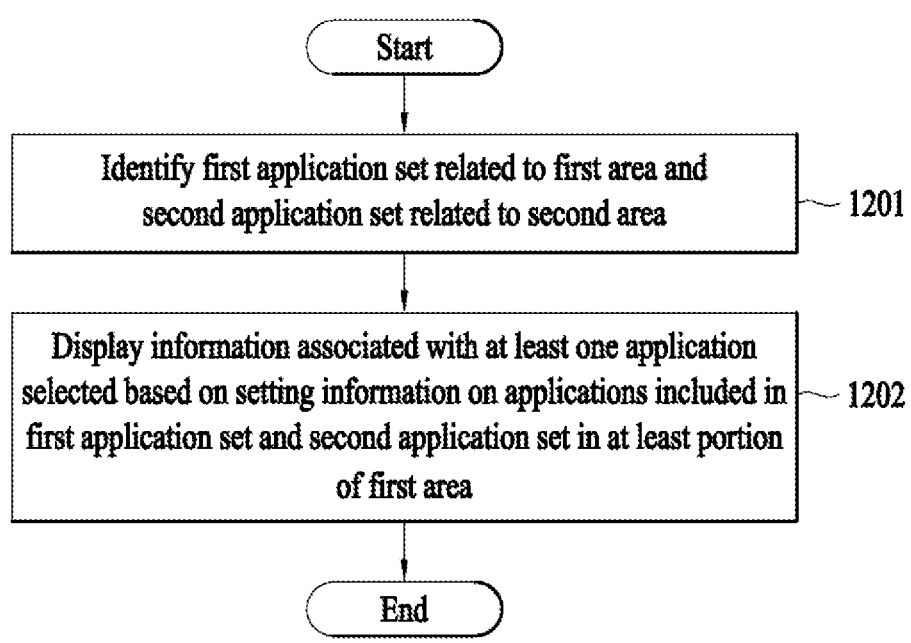
FIG. 12 is a flowchart illustrating operations of a method of controlling a mobile terminal according to an example embodiment of the present disclosure.

FIG. 12 is a flowchart illustrating operations of a method of controlling a mobile terminal according to an example embodiment of the present disclosure. Operations illustrated in FIG. 12 may be performed in different orders or irrespective of an order depending on cases. Hereinafter, redundant descriptions, which have been made above, will be omitted.

Referring to FIG. 12, in operation 1201, the mobile terminal may identify a first application set related to a first area and a second application set related to a second area. In some cases, a third application set related to the first area and the second area may be present. In such cases, the mobile terminal may identify the third application set.

Here, the first application set may include at least one application of which content is displayed through the first area of the display. The second application set may include at least one application of which content is displayed through the second area of the display. The third application set may include at least one application of which content is displayed through at least a portion of the first area and the second area of the display.

In operation 1202, the mobile terminal may display information associated with at least one application selected based on setting information on applications included in the first application set and the second application set in at least a portion of the first area. Specifically, when at least a portion of the second area is positioned to the second side, in response to an input related to the first area, the mobile terminal may display information associated with at least one application selected based on the setting information on the applications included in the first application set and the second application set in at least a portion of the first area.

The input related to the first area may be a predetermined input received through at least a portion of the first area and may include, for example, an input for requesting information associated with an application having content provided through the first area positioned to the first side, to be displayed. For example, the predetermined input may be implemented as a touch input or drag input applied to at least a portion of the first area.

At least one application selected based on the setting information on the applications included in the first application set and the second application set may include, for example, at least one application having first setting information. The first setting information may be information for setting, in response to at least a portion of an area related to an application being positioned to the second side, information associated with the application to be displayed in at least a portion of the area positioned to the first side. Second setting information may be information for setting, when at least a portion of the area related to the application is positioned to the second side, information associated with the application to be displayed in the area related to the application in response to the area positioned to the second side being positioned back to the first side. Third setting information may be information for setting displaying of information associated with the application to be terminated in response to at least a portion of the area related to the application being positioned to the second side.

Meanwhile, the information associated with the application displayed in at least a portion of the first area may include, for example, information representing the application and an icon representing setting information on the application. In this case, when an input to the icon is received, the setting information corresponding to the icon may be changed to another piece of setting information.

In some cases, the predetermined input may be received in a state in which the first area and the second area are positioned to the first side. In such cases, information on an application included in each of the first application set and the second application set may be displayed in at least a portion of the first area and the second area. As an example, information on an application included in the first application set may be displayed in the first area, and information on an application included in the second application set may be displayed in the second area. A related example will be described in detail with reference to FIG. 21. As another example, information on the applications included in the first application set and the second application set may be integrally displayed without separating the first area and the second area. A related example will be described in detail with reference to FIG. 22.

Figure 13:
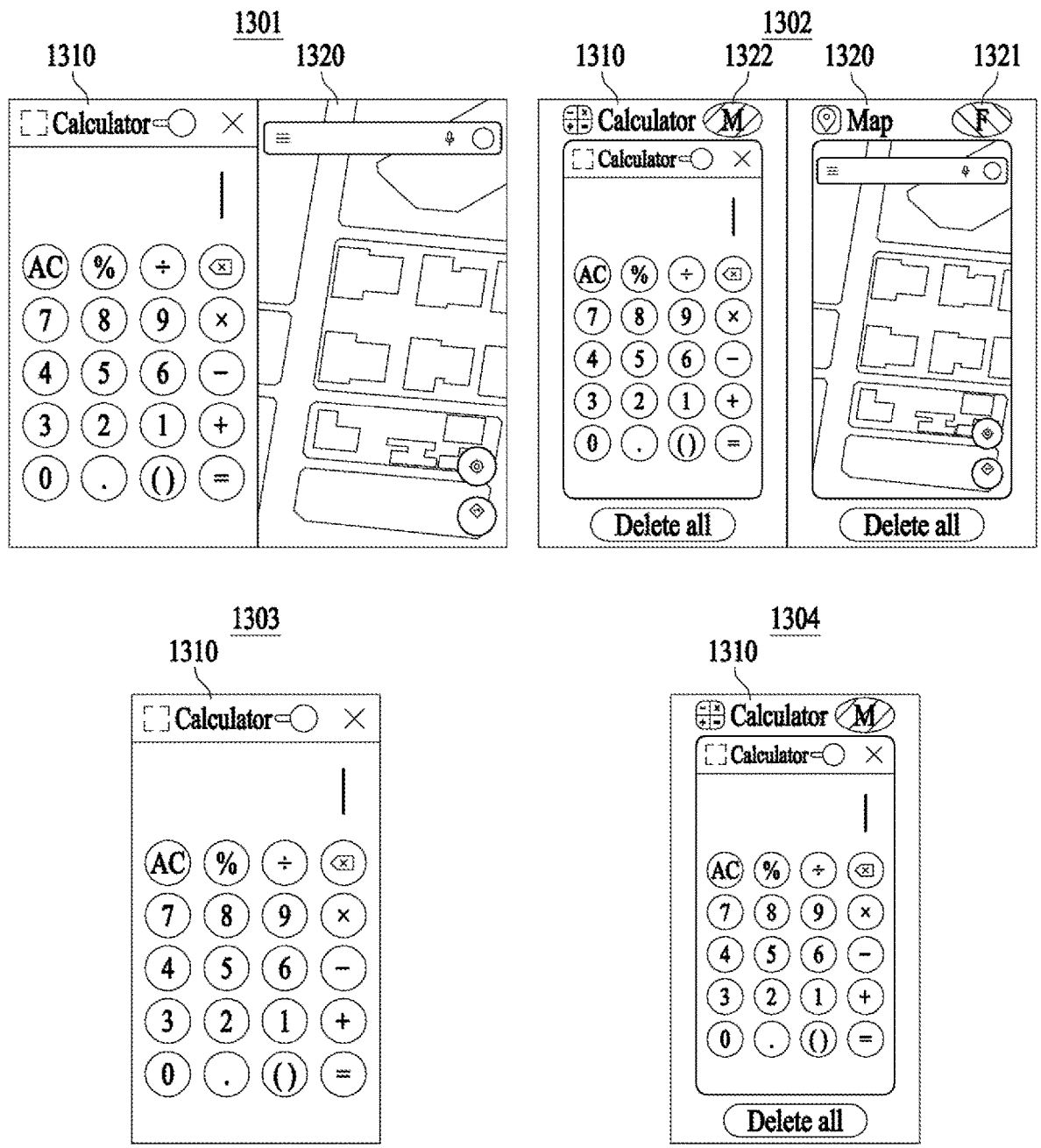
FIG. 13 is a diagram illustrating an example of setting information on an application of a mobile terminal according to an example embodiment of the present disclosure.

FIG. 13 is a diagram illustrating an example of setting information on an application of a mobile terminal according to an example embodiment of the present disclosure.

As indicated by reference numeral 1301 of FIG. 13, content of a first application may be displayed in a first area 1310 of the display positioned at the first side, and content of a second application may be displayed in a second area 1320 of the display positioned at the first side. In this instance, the first application may relate to the first area 1310, and the second application may relate to the second area 1320. In addition, although not shown, other related applications may be further present in the first area 1310 or the second area 1320.

In the example embodiment, at least one application related to each area may be referred to as an "application set." For example, at least one application related to the first area 1310 may correspond to a first application set, and at least one application related to the second area 1320 may correspond to the second application set.

As indicated by the reference numeral 1301, the first application may include a calculator application and the second application may include a map application. However, it is merely an example, and the present example is not to be taken as being limited thereto.

Reference numeral 1302 represents an example of displaying information on an application related to each area of the display based on a predetermined input being received. For example, when a first input is received, the mobile terminal may display information on the first application related to the first area 1310 of the display in at least a portion of the first area 1310 and display information on the second application related to the second area 1320 in at least a portion of the second area 1320.

In the example embodiment, the information on the first application may include, at least one of, for example, preview content representing content provided by the first application in a form of a preview and content (or icon) 1322 representing a name of the first application and setting information on the first application. The information on the second application may include at least one of, for example, preview content representing content provided by the second application in the form of the preview and content 1321 representing a name of the second application and setting information on the second application.

In the example embodiment, information on an application set related to each area of the display may be displayed based on a reception of a predetermined input. For example, as indicated by the reference numeral 1302, the information on the first application that is one of the applications included in the first application set may be displayed in the first area 1310. The information on the second application that is one of the applications included in the second application set may be displayed in the second area 1320.

In the example embodiment, the setting information on the first application may correspond to the first setting information, and the setting information on the second application may correspond to the second setting information. Here, the first setting information may include setting information for changing, in response to at least a portion of an area corresponding to an application being positioned to the second side, the area corresponding to the application to be an area positioned to the first side. In this case, an application including the first setting information may be continuously provided through the first side irrespective of a change in size of the display. Here, the continuous provision may indicate that an execution of the application is continued in association with the first side instead of terminating based on a placement of a related area, but is not limited thereto. The second setting information may be information for fixedly setting the area corresponding to the application. In addition, the second setting information may include information for suspending, when the area related to the application is positioned to the second side, displaying of content while maintaining an execution until the related area is positioned back to the first side. In this case, the content of the application may be displayed based on the related area positioned back to the first side.

Reference numeral 1303 represents an example of the second area 1320 positioned to the second side of the mobile terminal in a state in which setting information is designated for each application as indicated by the reference numeral 1302. As indicated by the reference numeral 1303, the content of the application related to the first area 1310, that is, the first application may be displayed in the first area 1310.

Although not shown, in some example embodiments, when a predetermined input is received, a screen similar to the example of the reference numeral 1302 may be displayed on the display. Specifically, when a predetermined input is received, the information on the application related to the first area 1310 may be displayed in the first area 1310. In this case, the information displayed in the first area 1310 may correspond to information displayed in the first area 1310 in the example indicated by the reference numeral 1302.

Meanwhile, in the example of the reference numeral 1303, information on the second area 1320 may not be displayed because the second area 1320 is positioned to the second side. However, it is merely an example, and in some cases, information associated with the second area 1320 may be provided. A related example will be described in detail with reference to FIG. 16.

Figure 14:
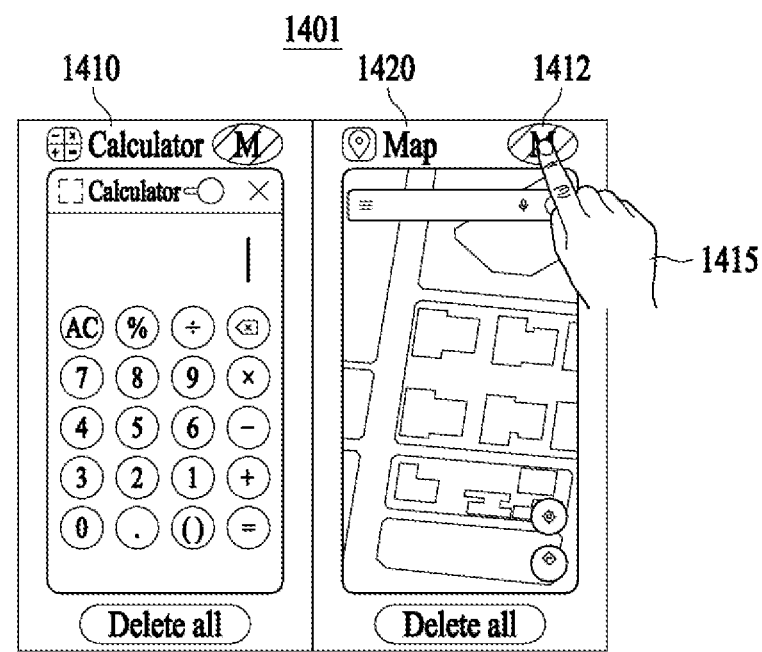
FIG. 14 is a diagram illustrating setting information on an application of a mobile terminal and an example of changing the setting information according to an example embodiment of the present disclosure.
Figure 14:
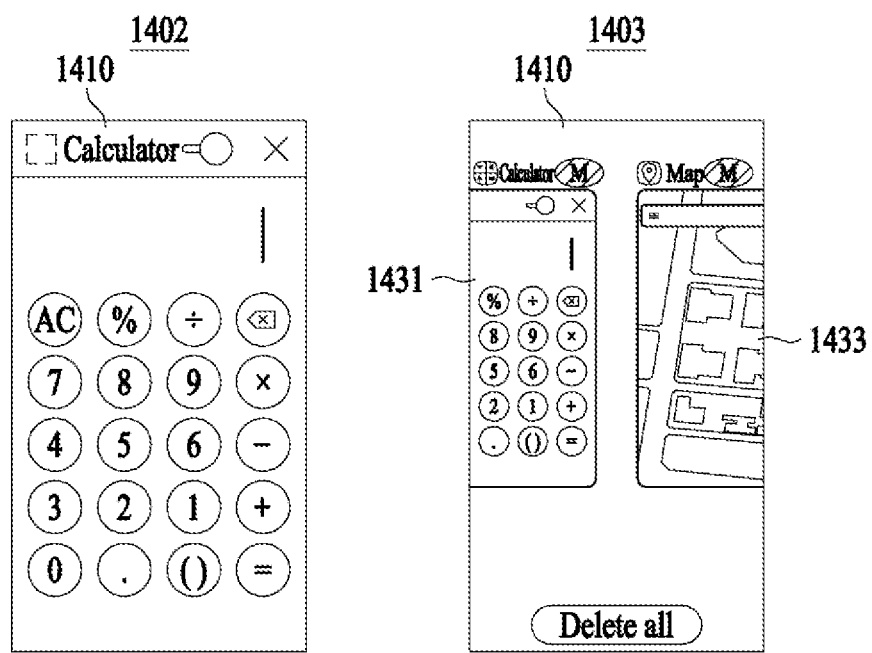

FIG. 14 is a diagram illustrating setting information on an application of a mobile terminal and an example of changing the setting information according to an example embodiment of the present disclosure.

Reference numeral 1401 of FIG. 14 represents an example of displaying information on an application related to a first area 1410 and information on an application related to a second area 1420 in response to a predetermined input being received. The reference numeral 1401 indicates a screen displayed in response to a predetermined input for requesting information on applications (or an application set) related to a first area and a second area to be displayed in a state in which the first area and the second area are positioned to a first side of a display. The applications related to the first area and the second area may include an application that has been recently executed or an application being currently executed in association with the first area and the second area. As illustrated, an application related to the first area and an application related to the second area may be separately displayed based on areas, and it is merely an example.

According to the reference numeral 1401, setting information on the first application related to the first area 1410 may correspond to first setting information, and setting information on the second application related to the second area 1420 may correspond to second setting information. Accordingly, information associated with the first application may include first content 1411 representing the first setting information, and information associated with the second application may include second content 1412 representing the second setting information.

In the example embodiment, when an input to content representing setting information is received, the mobile terminal may change the setting information corresponding to the input to another piece of setting information. For example, when an input (e.g., touch input) 1415 to the second content 1412 is received, the mobile terminal may change setting information on the application corresponding to the second content 1412, that is, the second application to the first setting information. Here, as described with reference to FIG. 13, the first setting information may include setting information for changing an area corresponding to an application to another area (e.g., the first area 1410) positioned to the first side in response to a related area (e.g., the second area 1420) being positioned to the second side. In this case, content of the application may be displayed through the changed area. The second setting information may include setting information for fixing an application (e.g., the second application) in the second area 1420 irrespective of a placement of the related area (e.g., the second area 1420).

Meanwhile, in the present example embodiment, the second setting information may be changed to the first setting information in response to the touch input being received. However, it is merely an example, and setting information may be changed in an order determined in advance. As an example, when a touch input is received once in a state in which the content of the first setting information is displayed, the first setting information may be changed to the second setting information. In this example, when the touch input is received twice, the first setting information may be changed to third setting information. As another example, each time that the touch input is received, the setting information may be changed from the first setting information to the second setting information, changed from the second setting information to the third setting information, and changed from the third setting information to the first setting information.

Reference numeral 1402 represents an example of a screen displayed in the first area 1410 positioned to the first side in response to the second area 1420 of the display positioned at the first side being positioned to the second side of the display. As indicated by the reference numeral 1402, content of an application related to the first area 1410 may be displayed in the first area 1410.

In the example embodiment, in response to the second area 1420 of the display positioned at the first side being positioned to the second side, an application corresponding to the first setting information in the second application set may be included in the first application set.

The reference numeral 1402 represents a case in which content of a predetermined application satisfying a predetermined condition among at least one application included in the first application set related to the first area 1410 is displayed. The predetermined condition may include, for example, a most recently executed application among the at least one application included in the first application set. Content of the application indicated by the reference numeral 1402 may include content related to a function of the application provided based on an execution of the application.

In the example of the reference numeral 1402, content that has been displayed in the first area 1410 previously, for example, before the second area 1420 is positioned to the second side, that is, the content of the first application may be continuously displayed. However, it is merely an example. When the second application satisfies the predetermined condition, the content of the second application may be displayed in at least a portion of the first area 1410.

In an uppermost layer, even when the content of the first application is displayed in the first area 1410 based on the execution of the first application as indicated by the reference numeral 1402, the second application may also run together in association with the first area 1410. In this case, when an input related to the first area 1410 (or an area of the display positioned at the first side) is received, the mobile terminal may display a screen as indicated by reference numeral 1403. Here, the input related to the first area 1410 may include, for example, an input for requesting information on the application related to the first area 1410 or an application being currently executed in association with the first area 1410.

As indicated by the reference numeral 1403, information on the application related to the first area 1410, information 1431 on the first application, and information 1433 on the second application may be displayed. In the example embodiment, the application related to the first area 1410 may correspond to an application having the first setting information.

Meanwhile, a screen displayed based on an input to the first area 1410 after the second area 1420 is positioned to the second side may be provided in a different way from that of the reference numeral 1403. A related example will be described in detail with reference to FIG. 15.

Figure 15:
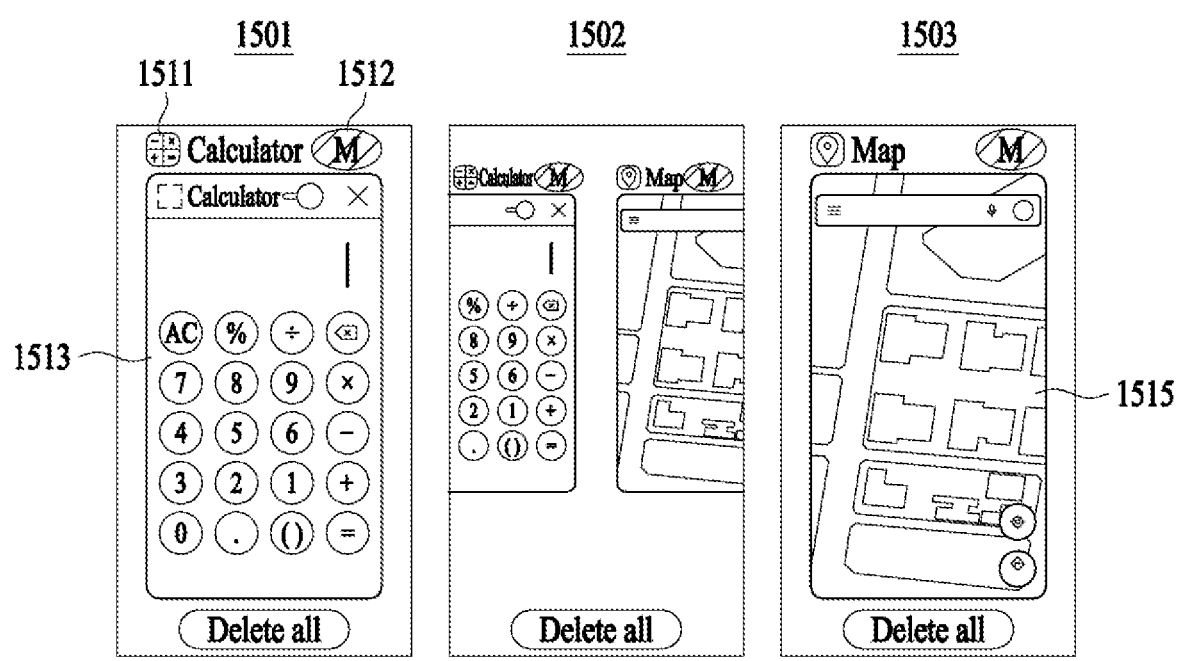
FIG. 15 is a diagram illustrating an example of displaying information associated with an application of a mobile terminal according to an example embodiment of the present disclosure.

FIG. 15 is a diagram illustrating an example of displaying information associated with an application of a mobile terminal according to an example embodiment of the present disclosure. Specifically, FIG. 15 illustrates an example of a screen displayed in a first area when the first area remains on the first side in response to a second area of the mobile terminal being positioned to a second side.

Reference numeral 1501 of FIG. 15 represents an example of displaying information on an application in the first area in response to an input related to the first area (or an area positioned to the first side). When the input related to the first area is received, the mobile terminal may display information associated with an application set to display content through the first area, for example, having first setting information in at least a portion of the first area.

For example, as indicated by the reference numeral 1501, the information associated with the application may include a name of the application, an icon 1511 representing the application, an icon 1512 representing setting information on the application, and preview content 1513 related to a function provided by the application.

In the example embodiment, the mobile terminal may receive a swipe input having a first direction with respect to the first area. In this case, the mobile terminal may sequentially display screens of reference numerals 1502 and 1503. Specifically, as indicated by the reference numeral 1502 and the reference numeral 1503, the mobile terminal may display information 1515 on the application, which is not displayed in the example of the reference numeral 1501.

Although not shown, when a swipe input corresponding to a second direction facing the first direction is received, the mobile terminal may provide the screen of the reference numeral 1501 again.

In the example embodiment, as described with reference to FIG. 15, the mobile terminal may identify information associated with an application included in an application set related to the first area.

Meanwhile, in the overall example embodiments, the drag input and the swipe input are described as an example of a touch input having a direction, and the touch input having a direction is not limited to the drag input and the swipe input.

Figure 16:
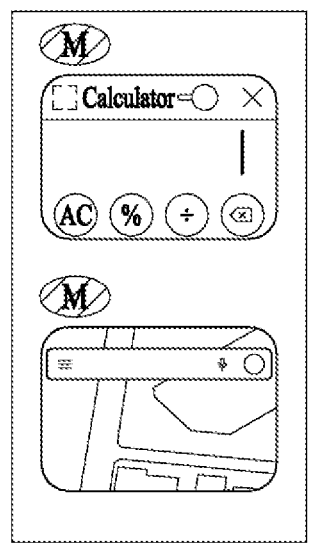
FIG. 16 is a diagram illustrating another example of displaying information associated with an application of a mobile terminal according to an example embodiment of the present disclosure.
Figure 16:
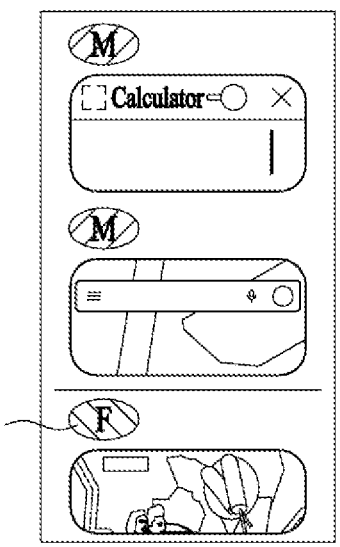

FIG. 16 is a diagram illustrating another example of displaying information associated with an application of a mobile terminal according to an example embodiment of the present disclosure. Specifically, FIG. 16 illustrates examples of providing information associated with an application through a first area in different ways compared to the examples of FIG. 15.

Referring to FIG. 16, reference numeral 1601 represents an example of displaying information on an application related to a first area in the first area in response to a second area being positioned to a second side, and reference numeral 1602 represents an example of displaying information on the application related to the first area and an application related to the second area in the first area in response to the second area being positioned to the second side.

As indicated by the reference numeral 1601, information on an application having first setting information may be displayed in the first area. As illustrated, the information on the application may represent the entire application having the first setting information so as to be easily acknowledged at a glance. (In the example of the reference numeral 1601, it is assumed that two applications have the first setting information.)

As indicated by the reference numeral 1602, an application having the first setting information and an application having the second setting information may be displayed together in the first area. The first setting information and the second setting information have been described in the foregoing and thus, descriptions of such will be omitted.

When an input to an icon corresponding to second setting information is received while the screen of the reference numeral 1602 is provided, setting information may be changed based on the input. For example, when a touch input to an icon 1611 corresponding to the second setting information is received, the icon 1611 may be changed to an icon corresponding to the first setting information, and setting information on an application corresponding to the second setting information may be changed to the first setting information. In this case, in response to the setting information being changed, content of the application may be provided through the first area. That is, in response to the setting information being changed, the application may be executed based on the first area.

Figure 17:
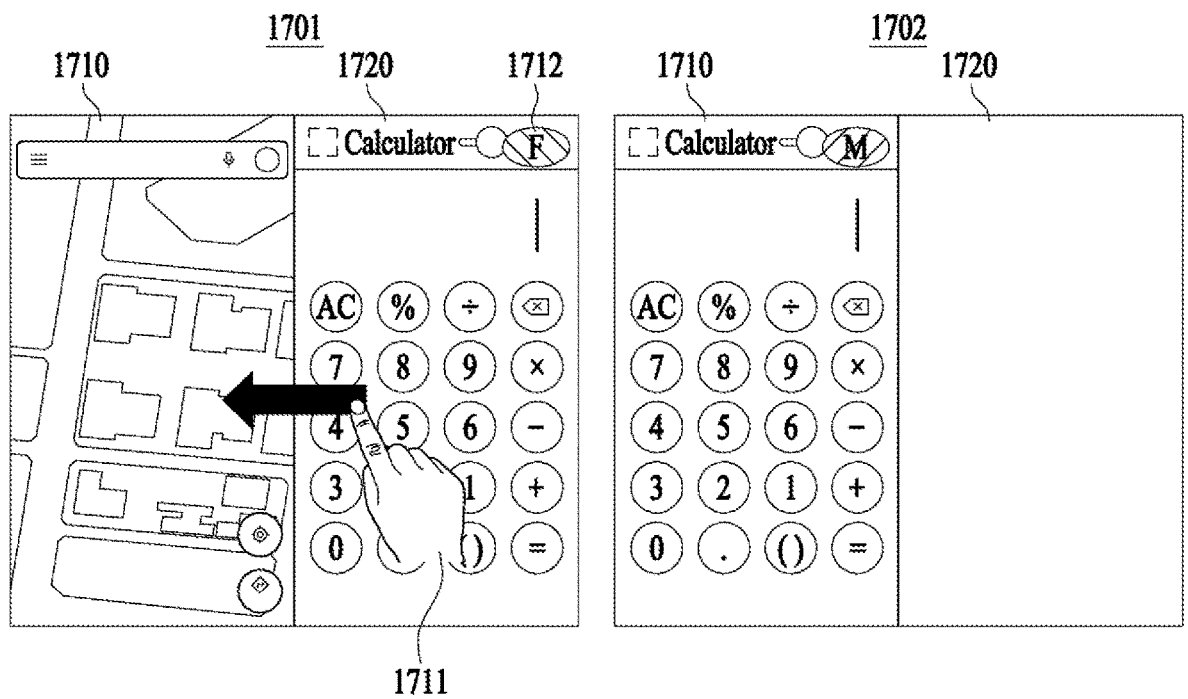
FIG. 17 is a diagram illustrating an example of changing setting information based on a movement of content of an application of a mobile terminal according to an example embodiment of the present disclosure.

FIG. 17 is a diagram illustrating an example of changing setting information based on a movement of content of an application of a mobile terminal according to an example embodiment of the present disclosure.

As indicated by reference numeral 1701 of FIG. 17, content of a first application may be displayed in a first area 1710 of the mobile terminal, and content of a second application may be displayed in a second area 1720. In this instance, setting information on the second application may correspond to second setting information. Meanwhile, an icon 1712 representing the second setting information indicated by the reference numeral 1701 is for convenience of descriptions and thus, may be omitted in some example embodiments or displayed when information on an application is displayed based on a predetermined input.

In the example embodiment, the mobile terminal may receive an input 1711 (e.g., a long-press and drag input) for selecting at least a portion of content displayed in the second area 1720 and moving the selected portion to a position corresponding to at least a portion of the first area 1710.

In this case, content that has been displayed may be moved to and displayed in the second area as indicated by reference numeral 1702. In addition, at this time, the mobile terminal may verify that the position to which the content is moved is the first area 1710. Based on this, the mobile terminal may change the setting information on the second application from the second setting information to the first setting information.

In the example embodiment, when content of a predetermined application is displayed in at least a portion of the first area 1710, the mobile terminal may designate setting information on the predetermined application to be the first setting information.

Although not shown, when an input for moving the content of the first application displayed in the first area 1710 to the second area 1720 is received, the mobile terminal may change the setting information on the first application to predetermined setting information, for example, the second setting information.

Figure 18:
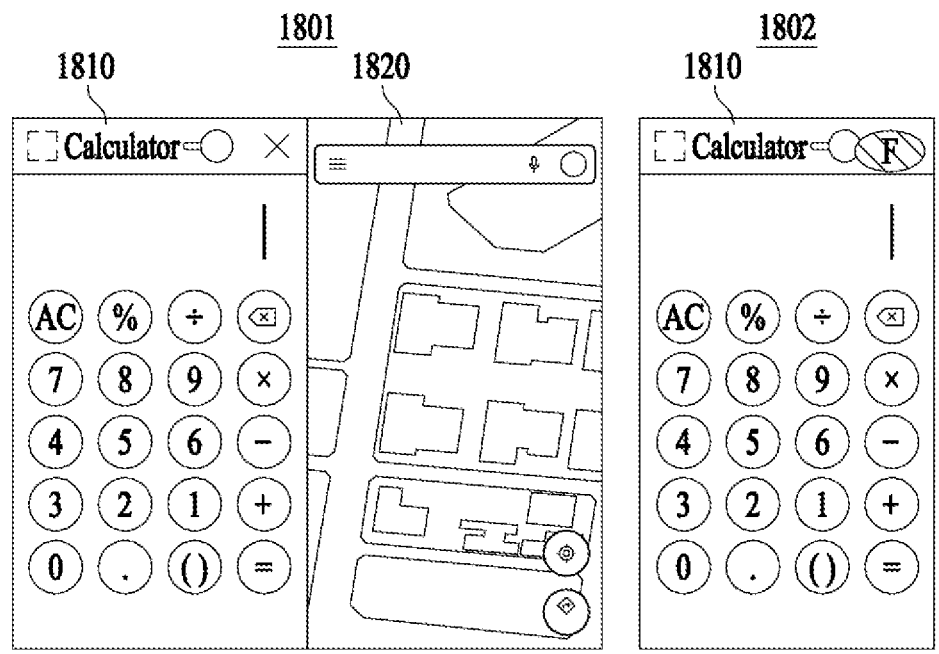
FIGS. 18 and 19 are diagrams illustrating content displayed in response to a change in size of a display based on setting information on a mobile terminal according to an example embodiment of the present disclosure.
Figure 18:
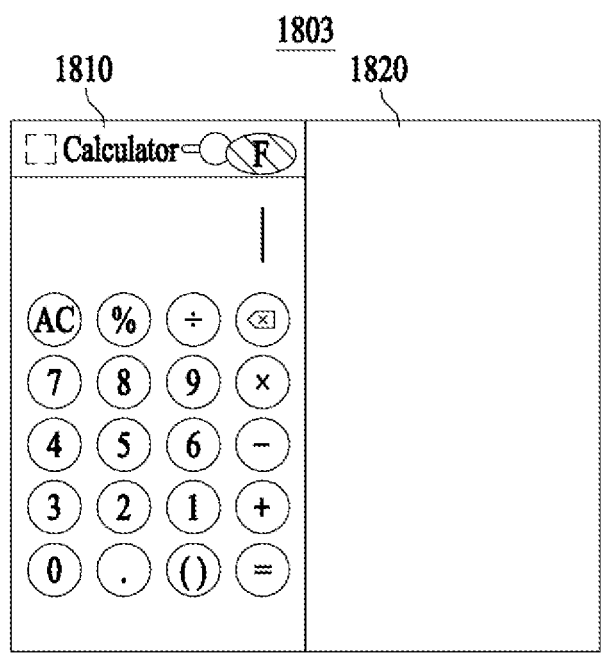
Figure 19:
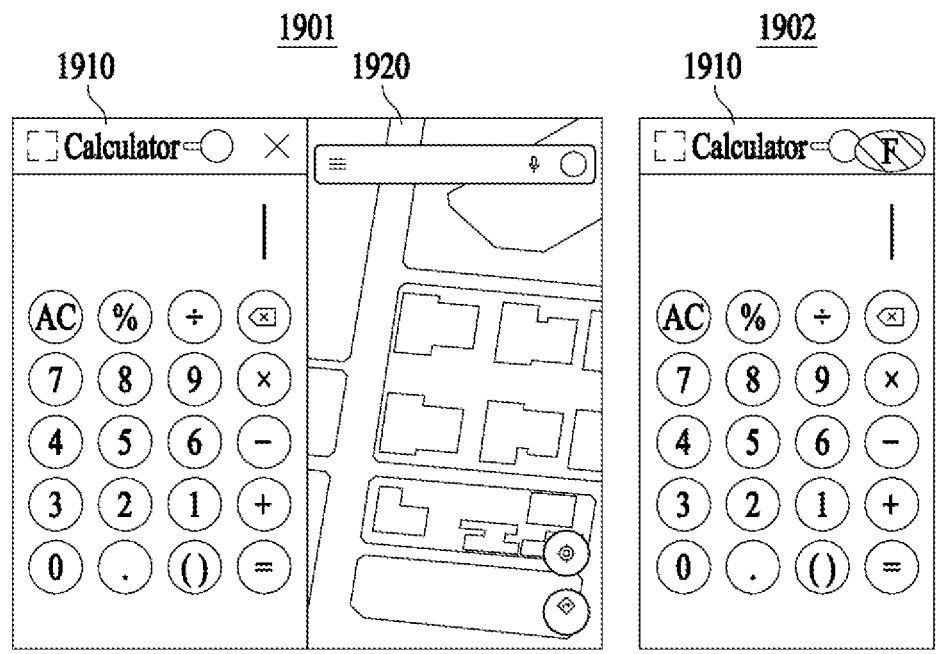
Figure 19:
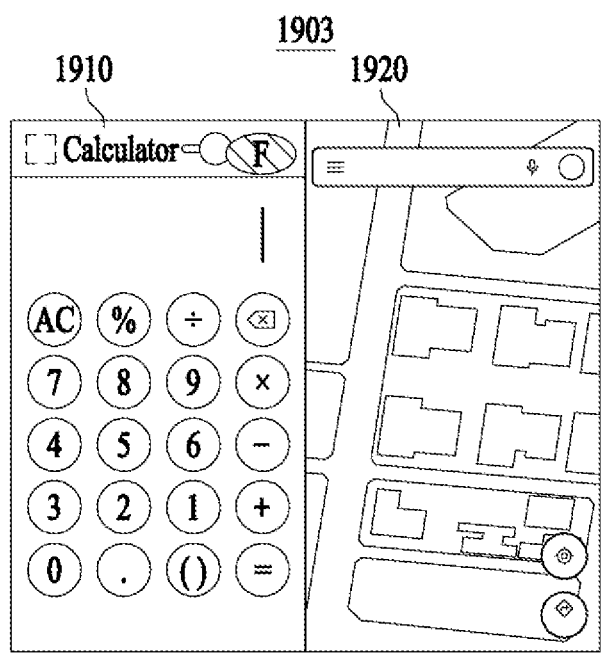

FIGS. 18 and 19 are diagrams illustrating content displayed in response to a change in size of a display based on setting information on a mobile terminal according to an example embodiment of the present disclosure.

FIG. 18 illustrates an example of a screen displayed on a display when setting information on an application corresponding to a second area 1820 is first setting information or third setting information. Reference numeral 1801 of FIG. 18 represents a case in which a first area 1810 and the second area 1820 are positioned to a first side of a display, content of a first application is displayed in the first area 1810, and content of a second application is displayed in the second area 1820. In this instance, setting information on the second application may correspond to the first setting information or the third setting information.

In this case, in response to the second area 1820 being positioned to the second side, the first area 1810 may be positioned to the first side as indicated by reference numeral 1802. The content of the first application may be displayed in the first area 1810.

In the example embodiment, when the setting information on the second application corresponds to the first setting information, and when the second application satisfies a predetermined condition, the content of the second application may be displayed in the first area 1810 of the reference numeral 1802. The predetermined condition may include, for example, a condition of being a most recently executed application, but is not limited thereto. Meanwhile, when the setting information on the second application corresponds to the third setting information, the second application may terminate in response to the second area 1820 being positioned to the second side. Thus, irrespective of whether the second application satisfies the predetermined condition, the content of the first application may be displayed in the first area 1810.

In some cases, the second area 1820 may be positioned back to the first side. In such cases, when the setting information on the second application corresponds to the first setting information or the third setting information, the content of the second application may not be displayed in the second area 1820 as indicated by reference numeral 1803.

FIG. 19 illustrates an example of a screen displayed on a display when setting information on an application corresponding to a second area 1920 is second setting information. Since reference numeral 1901 of FIG. 19 may correspond to the reference numeral 1801 of FIG. 18 and reference numeral 1902 of FIG. 19 may correspond to the reference numeral 1802 of FIG. 18, redundant descriptions will be omitted.

As indicated by reference numeral 1903 of FIG. 19, in response to the second area 1920 positioned to the second side being positioned back to the first side, the content of the second application, which has been displayed as indicated by the reference numeral 1901, may be displayed in the second area 1920.

Figure 20:
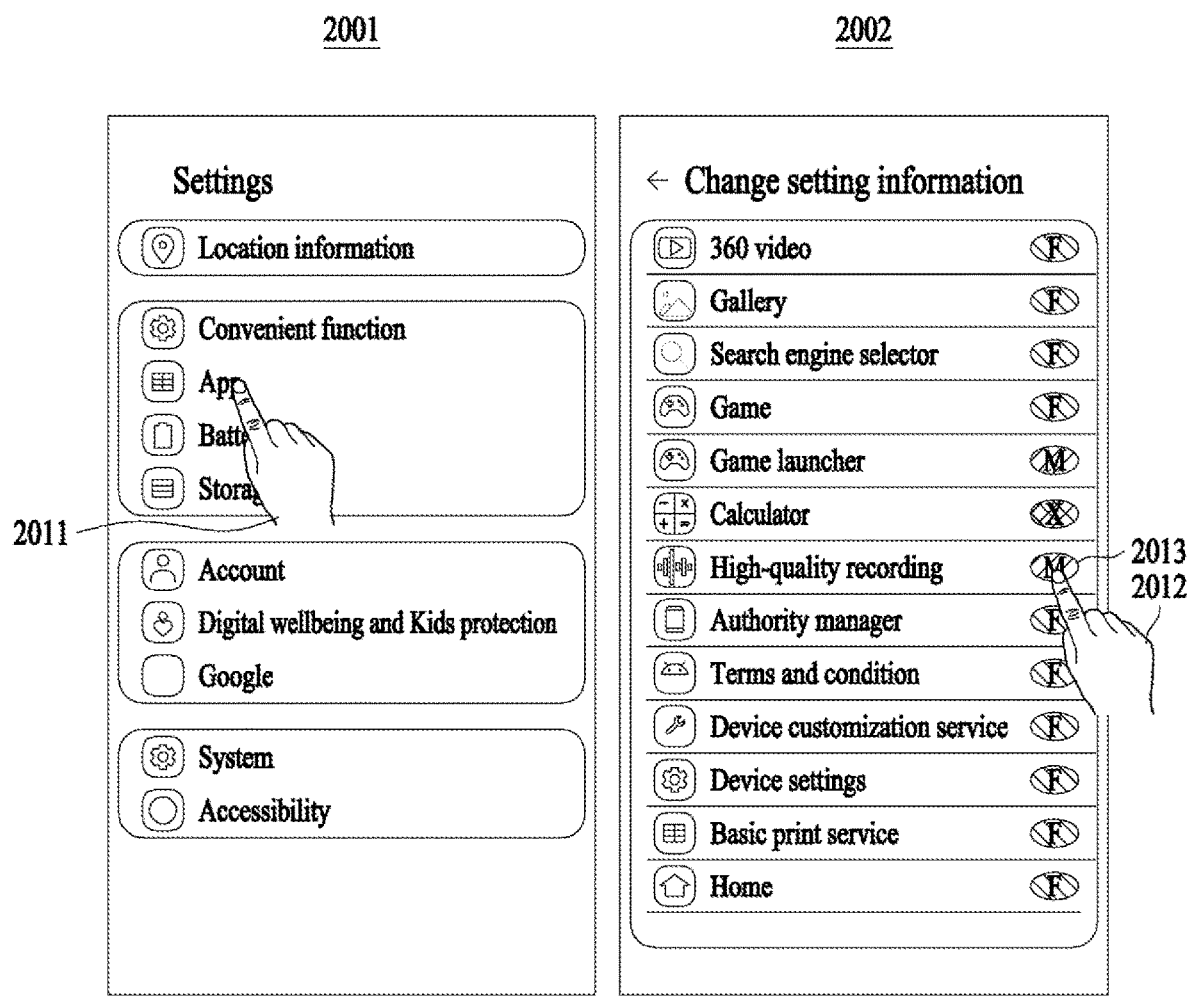
FIG. 20 is a diagram illustrating a case in which setting information is designated for each application of a mobile terminal according to an example embodiment of the present disclosure.

FIG. 20 is a diagram illustrating a case in which setting information is designated for each application of a mobile terminal according to an example embodiment of the present disclosure.

As indicated by reference numeral 2001 of FIG. 20, a screen showing setting menus may be displayed based on an execution of a setting application of the mobile terminal. As illustrated, when a user input 2011 to a predetermined menu, for example, a menu "App" among the displayed setting menus is received, a screen for designating setting information for each application may be displayed as indicated by reference numeral 2002.

As indicated by the reference numeral 2002, the mobile terminal may provide a screen showing the setting information designated for each application. In this case, when an input 2012 to an icon corresponding to the setting information, for example, a first icon 2013 is received, setting information on an application corresponding to the first icon 2013 may be changed.

Meanwhile, the case described with reference to FIG. 20 is merely an example of designating or changing setting information, and the present example is not to be taken as being limited thereto.

Figure 21:
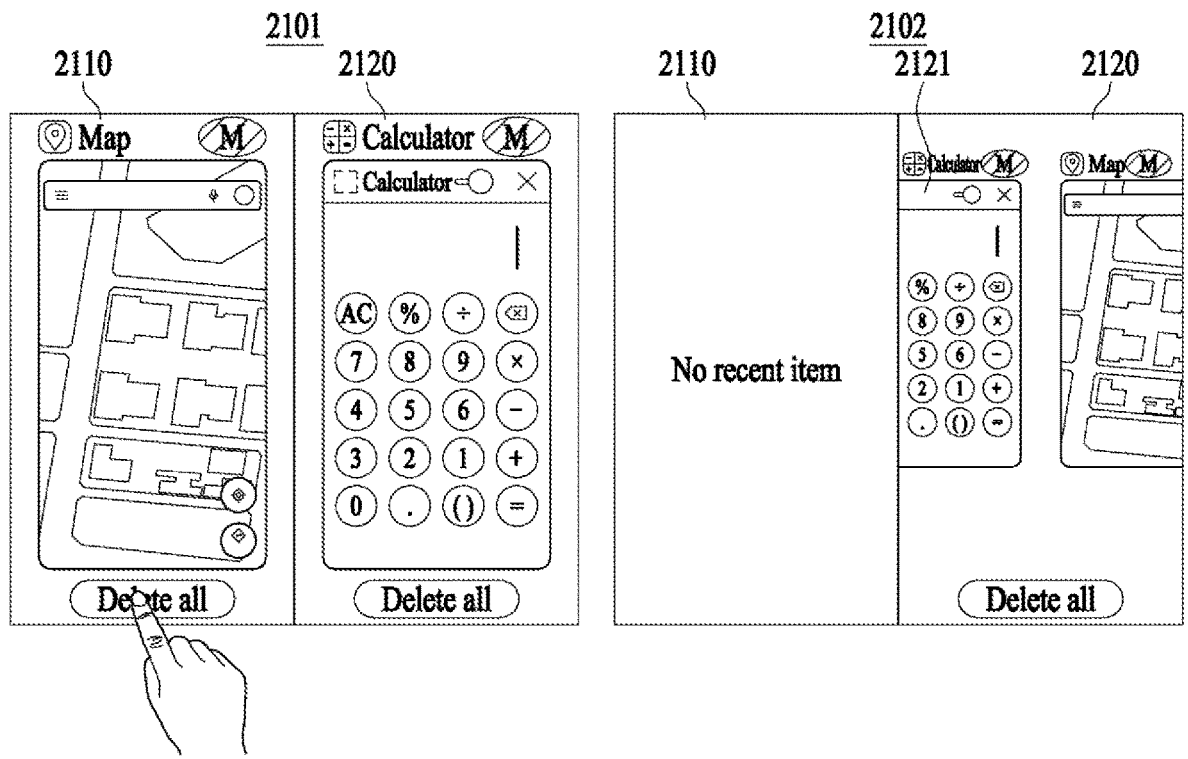
FIGS. 21 through 23 are diagrams illustrating examples of displaying information associated with an application on a mobile terminal according to an example embodiment of the present disclosure.
Figure 22:
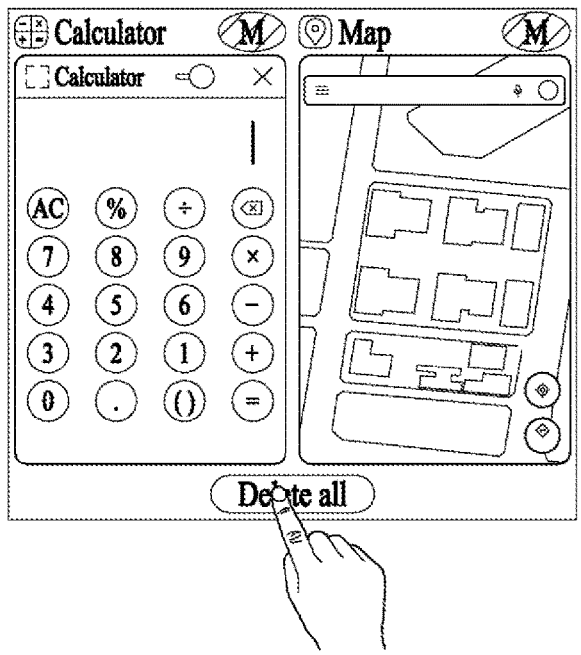
Figure 22:
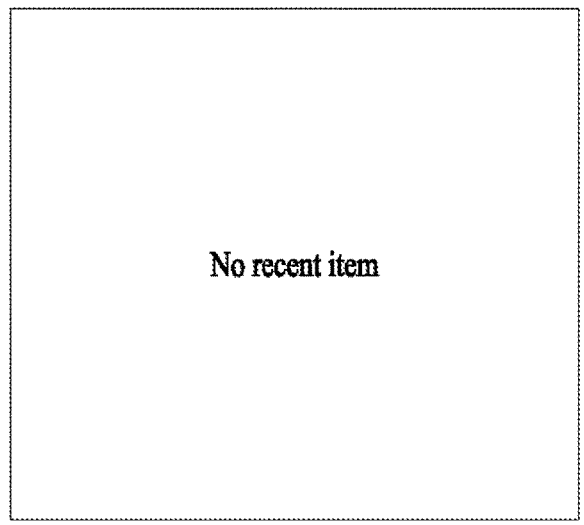
Figure 23:
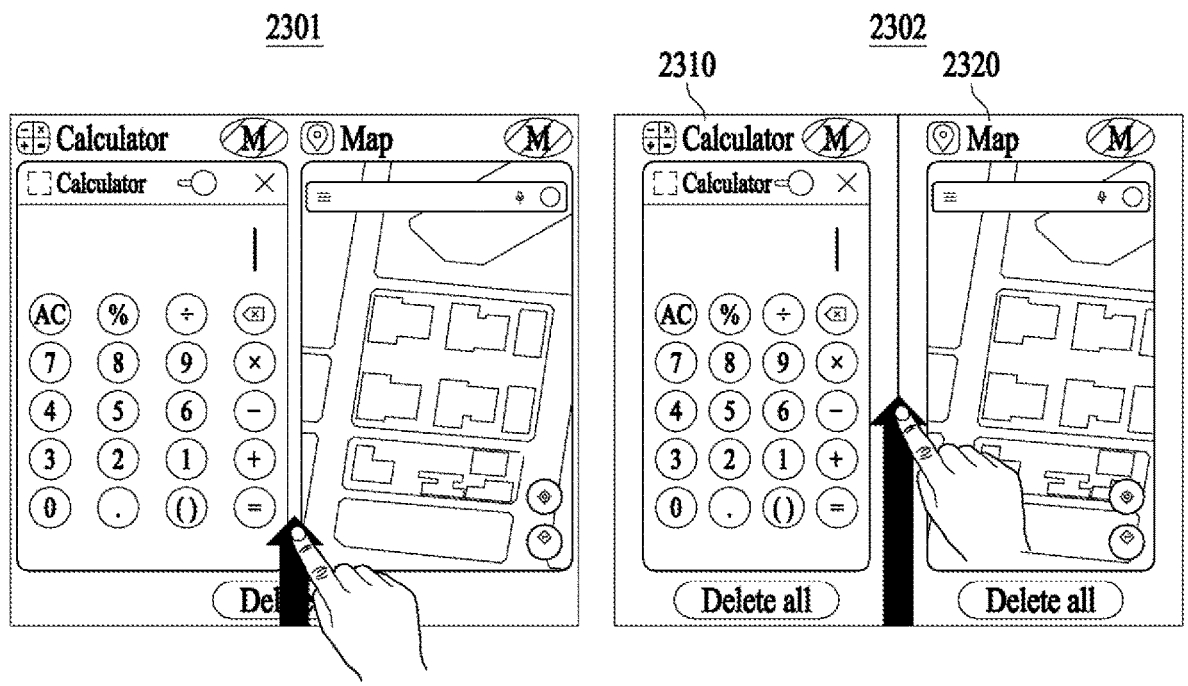

FIGS. 21 through 23 are diagrams illustrating examples of displaying information associated with an application on a mobile terminal according to an example embodiment of the present disclosure.

FIG. 21 illustrates a case in which an application related to each area of a display is separately managed. As indicated by reference numeral 2101 of FIG. 21, information on an application related to a first area 2110 may be displayed in the first area 2110, and information on an application related to a second area may be displayed in the second area 2120.

In the example embodiment, when the applications related to the first area 2110 and the second area 2120 are managed separately, an icon for controlling an application for each area may be displayed as illustrated. For example, an icon "delete all" may be displayed in at least a portion of each of the first area 2110 and the second area 2120.

In the example embodiment, as indicated by the reference numeral 2101, a user input may be received on the icon "delete all." In this case, relating to the first area 2110, displaying of information on an application may be terminated. In addition, in some cases, executions of all applications related to the first area 2110 may be terminated.

In the example embodiment, the first setting information may include information for setting the application to be related to another area when a situation related to a suspension of executing an application is detected in relation to an area corresponding to the application. In this case, as indicated by reference numeral 2102, when the suspension of executing the application related to the first area 2110 is triggered (e.g., when an input to the icon "delete all" of the first area 2110 is received,) an application having the first setting information among the applications related to the first area 2110 may be continuously executed with being changed to be related to the second area 2120.

Accordingly, information 2121 on the application having the first setting information may be displayed in the second area 2120 as indicated by the reference numeral 2102.

FIG. 22 illustrates a case in which applications related to areas of a display are integrally managed. As indicated by reference numeral 2201 of FIG. 22, information associated with an application may be displayed irrespective of separation of areas related to applications. In this case, an icon for controlling the application, for example, an icon "delete all" may be displayed in at least a portion of the first area and the second area.

When an input to the icon "delete all" is received as indicated by the reference numeral 2201, displaying of information on an application related to a first area and a second area may be terminated as indicated by reference numeral 2202. Further, in some cases, executions of all applications related to the first area and the second area may be terminated.

FIG. 23 illustrates an example of controlling, when a predetermined moving input is received, applications integrally or separately for each area based on a moving distance of the input.

As indicated by reference numeral 2301 of FIG. 23, when an input for requesting information associated with an application to be displayed has a first moving distance, the information associated with the application may be integrally displayed without separating areas related to applications.

As indicated by reference numeral 2302, when an input for requesting information associated with an application to be displayed has a second moving distance, the information associated with the application may be displayed separately for each related area. For example, as illustrated, information on an application related to a first area 2310 may be displayed in the first area 2310, and information on an application related to a second area 2320 may be displayed in the second area 2320.

Meanwhile, FIG. 23 illustrates that the first moving distance is less than the second moving distance, but it is merely an example.

According to example embodiments of the present disclosure, a mobile terminal and a control method of the mobile terminal may control an application execution-related state in consideration of a change in size of a display positioned at a first side of the mobile terminal, thereby achieving an efficiency in using a battery and a memory of the mobile terminal. Specifically, the mobile terminal and the control method of the mobile terminal may terminate some applications in response to a placement of related areas being changed and continuously run some other applications in response to a placement of related areas being changed based on setting information so that applications for a user are selectively executed, which may prevent waste of the battery or the memory. Accordingly, the efficiency of the battery and the memory may be improved, and further, a usability of the mobile terminal may be improved.

The above description is merely illustrative of the technical idea of the present disclosure, and those skilled in the art to which the present disclosure pertains can make various modifications and changes without departing from the essential quality of the present disclosure. Accordingly, the example embodiments disclosed herein are not intended to limit the technical spirit of the present disclosure but to describe the present disclosure, and the scope of the technical spirit of the present disclosure is not limited by these example embodiments. The scope of protection of the present disclosure should be interpreted by the following claims, and all technical ideas that fall within the scope of equivalents thereof should be construed as being included in the scope of the present disclosure.

What is claimed is:

1. A mobile terminal comprising:
 a display comprising a first area and a second area, wherein the first area is positioned at a first side of the mobile terminal and the second area is positionable between the first side and a second side of the mobile terminal, wherein the first side corresponds to a front of the mobile terminal and the second side corresponds to a rear of the mobile terminal;
 a controller configured to:
 identify a first application set, comprising at least one application, as being related to the first area of the first side of the display when at least a portion of the second area is positioned at the second side of the mobile terminal;
 identify a second application set, comprising at least one application, as being related to the second area of the display when at least a portion of the second area is positioned at the second side of the mobile terminal;

cause the display to display at the second area, information associated with at least one application of the first application set, based on the second area of the display being positioned at the first side of the mobile terminal; and cause the display to display at the first area, and no longer display at the second area, the information associated with the at least one application of the first application set, based on at least a portion of the second area of the display being positioned at the second side.

2. The mobile terminal of claim 1, wherein the controller is further configured to:

identify a third application set, comprising at least one application, as being related to the first area and the second area when the second area is positioned at the first side of the mobile terminal, and as being related to the first area when the at least a portion of the second area is positioned at the second side of the mobile terminal;

cause the display to display at the first area and the second area, information associated with the at least one application of the third application set, based on the second area of the display being positioned at the first side of the mobile terminal; and cause the display to display at the first area, and no longer display at the second area, the information associated with the at least one application of the third application set, based on at least a portion of the second area of the display being positioned at the second side.

3. The mobile terminal of claim 1, wherein the controller is further configured to:

identify a third application set, comprising at least one application, as being related to one of the first area or the second area of the display when the second area is positioned at the first side of the mobile terminal and as being related to neither the first area nor the second area of the display when at least a portion of the second area is positioned at the second side of the mobile terminal;

cause the display to display at one of the first area or the second area, information associated with the at least one application of the third application set, based on the second area of the display being positioned at the first side of the mobile terminal; and cause the display to no longer display information associated with the at least one application of the third application set at either of the first area or the second area, based on the at least a portion of the second area being positioned at the second side of the mobile terminal.

4. The mobile terminal of claim 1, wherein the controller is further configured to:

cause the display to display a plurality of icons separately representing setting information for each of an associated one of the at least one application of the first application set and the second application set, wherein the setting information indicates which of the first application set or the second application set that a respective one of the at least application, of the first application set or the second application set, belongs; and change the setting information for an associated one of the at least one application, in response to an input being received with regard to an associated one of the plurality of icons.

5. The mobile terminal of claim 1, wherein the controller is further configured to:

cause the display to display information associated with the first application set in the first area and to display information associated with the second application set in the second area, in response to a first input being received in a state in which the first area and the second area are positioned at the first side; and change setting information for an application corresponding to a second input received on at least a portion of the displayed information associated with the first application set, and the displayed information associated with the second application, based on the second input, wherein the setting information indicates which of the first application set or the second application that the application corresponding to the second input belongs.

6. The mobile terminal of claim 5, wherein the controller is further configured to change the setting information for the application corresponding to the second input based on at least one of a moving direction or an input position of the second input.

7. The mobile terminal of claim 1, wherein the controller is further configured to:

identify, when a drag input is received, a moving distance of the received drag input;

cause the display to display, based on the identified moving distance being a first distance, information associated with an application included in the first application set and information associated with an application included in the second application set, in respectively separate areas; and cause the display to display, based on the identified moving distance being a second distance, information associated with an application included in the first application set and information associated with an application included in the second application set, in a same area.

8. The mobile terminal of claim 1, further comprising:

a first frame coupled to the display; and a second frame coupled to the display and the first frame, wherein the second frame is linearly positionable relative to the first frame to permit the second area to be positionable between the first side and the second side of the mobile terminal.

9. A method for controlling a mobile terminal comprising a display comprising a first area and a second area, wherein the first area is positioned at a first side of the mobile terminal and the second area is positionable between the first side and a second side of the mobile terminal, wherein the first side corresponds to a front of the mobile terminal and the second side corresponds to a rear of the mobile terminal, the method comprising:

identifying a first application set, comprising at least one application, as being related to the first area of the first side of the display when at least a portion of the second area is positioned at the second side of the mobile terminal;

identifying a second application set, comprising at least one application, as being related to the second area of the display when at least a portion of the second area is positioned at the second side of the mobile terminal;

displaying on the display at the second area, information associated with at least one application of the first application set, based on the second area of the display being positioned at the first side of the mobile terminal; and displaying on the display at the first area, and no longer displaying at the second area, the information associated with the at least one application of the first application set, based on at least a portion of the second area of the display being positioned at the second side.

10. The method of claim 9, further comprising:
identifying a third application set, comprising at least one application, as being related to the first area and the second area when the second area is positioned at the first side of the mobile terminal, and as being related to the first area when the at least a portion of the second area is positioned at the second side of the mobile terminal;
displaying on the display at the first area and the second area, information associated with the at least one application of the third application set, based on the second area of the display being positioned at the first side of the mobile terminal; and
displaying on the display at the first area, and no longer display at the second area, the information associated with the at least one application of the third application set, based on at least a portion of the second area of the display being positioned at the second side.

11. The method of claim 9, further comprising:
identifying a third application set, comprising at least one application, as being related to one of the first area or the second area of the display when the second area is positioned at the first side of the mobile terminal and as being related to neither the first area nor the second area of the display when at least a portion of the second area is positioned at the second side of the mobile terminal;
displaying on the display at the first area or the second area, information associated with the at least one application of the third application set, based on the second area of the display being positioned at the first side of the mobile terminal; and
causing the display to no longer display information associated with the at least one application of the third application set at either of the first area or the second area, based on the at least a portion of the second area being positioned at the second side of the mobile terminal.

12. The method of claim 9, further comprising:
causing the display to display a plurality of icons separately representing setting information for each of an associated one of the at least one application of the first application set and the second application set, wherein the setting information indicates which of the first application set or the second application set that a respective one of the at least application, of the first application set or the second application set, belongs;
changing the setting information for an associated one of the at least one application, in response to an input being received with regard to an associated one of the plurality of icons.

13. The method of claim 9, further comprising:
displaying on the display, information associated with the first application set in the first area and to display information associated with the second application set in the second area, in response to a first input being received in a state in which the first area and the second area are positioned at the first side; and
changing setting information for an application corresponding to a second input received on at least a portion of the displayed information associated with the first application set, and the displayed information associated with the second application is set based on the second input, wherein the setting information indicates which of the first application set or the second application that the application corresponding to the second input belongs.

14. The method of claim 13, further comprising:
changing the setting information for the application corresponding to the second input based on at least one of a moving direction or an input position of the second input.

15. The method of claim 9, further comprising:
identifying, when a drag input is received, a moving distance of the received drag input;
displaying on the display, based on the identified moving distance being a first distance, information associated with an application included in the first application set and information associated with an application included in the second application set, in respectively separate areas; and
displaying on the display, based on the identified moving distance being a second distance, information associated with an application included in the first application set and information associated with an application included in the second application set, in a same area.

* * * * *